(12) United States Patent
Lee et al.

(10) Patent No.: US 11,899,874 B2
(45) Date of Patent: *Feb. 13, 2024

(54) TOUCH DISPLAY DEVICE

(71) Applicant: LG Display Co., Ltd., Seoul (KR)

(72) Inventors: JaeGyun Lee, Paju-si (KR); JiHyun Jung, Paju-si (KR); DeukSu Lee, Paju-si (KR); SuChang An, Paju-si (KR); Ruda Rhe, Paju-si (KR); Hyangmyoung Gwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,834

(22) Filed: Feb. 28, 2023

(65) Prior Publication Data

US 2023/0214051 A1 Jul. 6, 2023

Related U.S. Application Data

(63) Continuation of application No. 17/845,603, filed on Jun. 21, 2022, now Pat. No. 11,614,828.

(30) Foreign Application Priority Data

Jun. 30, 2021 (KR) .................. 10-2021-0085548

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05); *G06F 2203/04111* (2013.01)

(58) Field of Classification Search
CPC .. G06F 3/04164; G06F 3/0446; G06F 3/0412; G06F 2203/04111
See application file for complete search history.

(56) References Cited

U.S. PATENT DOCUMENTS

| | | | |
|---|---|---|---|
| 11,023,074 B2 * | 6/2021 | Lee | ....................... H10K 59/122 |
| 2017/0199611 A1 * | 7/2017 | Brunet | ..................... G06F 3/047 |
| 2020/0019294 A1 | 1/2020 | Lee et al. | |

* cited by examiner

*Primary Examiner* — Peter D McLoone
(74) *Attorney, Agent, or Firm* — Fenwick & West LLP

(57) ABSTRACT

A touch display device is disclosed. Since a touch electrode line included in the display device is divided into two or more touch electrode line parts connected to different touch routing lines, an entire load of the touch electrode line and the touch routing line can be reduced. As a portion of the touch routing line is disposed on an active area and touch routing lines connected to different touch electrode line parts are connected to each other between the active area and a touch driving circuit, an entire load can be reduced without an increase of a non-active area and an increase of a channel due to the touch routing lines, and a performance of a touch sensing can be improved.

18 Claims, 24 Drawing Sheets

TOUCH DISPLAY DEVICE

CROSS REFERENCE TO RELATED APPLICATION

This application is a continuation of U.S. patent application Ser. No. 17/845,603 filed on Jun. 21, 2022 which claims priority from Republic of Korea Patent Application No. 10-2021-0085548, filed on Jun. 30, 2021, each of which is hereby incorporated by reference in its entirety.

BACKGROUND

Field

Embodiments of the present disclosure are related to a touch display device.

Description of Related Art

The growth of the information society leads to increased demand for display devices to display images and use of various types of display devices, such as liquid crystal display devices, organic light emitting display devices, etc.

The display devices, for providing more various functions, provide a function that recognizes a touch by a finger or a pen of the user being contacted to a display panel and performs an input process based on a recognized touch.

The display devices, for example, can comprise touch electrodes disposed on the display panel, or imbedded in the display panel. The display devices can comprise touch routing lines electrically connected to the touch electrodes. The display devices can drive the touch electrodes through the touch routing lines, and the display devices can sense a touch of the user to the display panel by detecting a change of a capacitance occurred by the touch of the user.

As a size of the display panel increases, a load of the touch electrodes and the touch routing lines can increase. There is a problem that an accuracy of the touch sensing decreases due to an increase of the load of the touch electrodes and the touch routing lines.

SUMMARY

Embodiments of the present disclosure can provide a touch display device being capable of improving an accuracy of a touch sensing by reducing a load of a touch electrode and a touch routing line.

Embodiments of the present disclosure can provide a touch display device being capable of reducing a load of a touch electrode and a touch routing line without an increase of a channel due to an addition of the touch routing line or an increase of an area due to an arrangement of the touch routing line.

Embodiments of the present disclosure can provide a touch display device comprising a substrate including an active area and a non-active area positioned outside of the active area, the active area including a plurality of subpixels; an encapsulation layer disposed on at least a part of the active area and the non-active area; a plurality of touch electrode lines disposed on the active area on the encapsulation layer, the plurality of touch electrode lines including two or more touch electrodes electrically connected to each other along one direction, and a plurality of touch routing lines electrically connected to at least one of the plurality of touch electrode lines; wherein at least one of the plurality of touch electrode lines include two or more touch electrode line parts separated from each other on the active area, wherein a first one of the two or more touch electrode line parts is connected to a first touch routing line partially disposed on the active area, and a second one of the two or more touch electrode line parts is connected to a second touch routing line disposed on the non-active area but not the active area, and wherein the first touch routing line and the second touch routing line are electrically connected to each other on an area outside of the active area.

Embodiments of the present disclosure can provide a touch display device comprising a substrate including an active area and a non-active area positioned outside of the active area, the active area including a plurality of touch electrodes; a plurality of touch electrode lines including two or more touch electrodes of the plurality of touch electrodes electrically connected to each other along one direction; a plurality of touch routing lines electrically connected to at least one of the plurality of touch electrode lines; and a touch driving circuit configured to drive the plurality of touch routing lines, wherein at least one of the plurality of touch electrode lines include two or more touch electrode line parts separated from each other on the active area, wherein a first one of the two or more touch electrode line parts is connected to a first touch routing line on the active area, and a second one of the two or more touch electrode line parts is connected to a second touch routing line on an area outside of the active area, and wherein the first touch routing line and the second touch routing line are electrically connected to each other on at least one point positioned between a boundary of the active area and the touch driving circuit.

In one embodiment, a touch display device comprises: a substrate including an active area and a non-active area positioned outside the active area, the active area including a plurality of subpixels configured to emit light; a touch electrode line disposed on the active area along a direction, the touch electrode line including a first plurality of touch electrodes connected to each other along the direction in the active area, and a second plurality of touch electrodes connected to each other along the direction in the active area; and a plurality of touch routing lines including a first touch routing line and a second touch routing line, the first touch routing line connected to the first plurality of touch electrodes but not the second plurality of touch electrodes in the active area, and the second touch electrode line connected to the second plurality of touch electrodes but not the first plurality of touch electrodes outside of the active area, wherein the first touch routing line and the second touch routing line are electrically connected to each other at an area outside of the active area.

According to various embodiments of the present disclosure, as a touch electrode line disposed on a same line on an active area is disposed to be separated and separated touch electrode lines are connected to different touch routing lines, thus a load by the touch electrode line and the touch routing line can be reduced.

According to various embodiments of the present disclosure, as at least one of the touch routing lines connected to the separated touch electrode lines is disposed on the active area, thus an increase of a bezel due to an arrangement of the touch routing line can be prevented.

According to various embodiments of the present disclosure, as a plurality of touch routing lines connected to the separated touch electrode lines are connected to each other on an area except the active area, thus an increase of a channel of a touch driving circuit due to an addition of the touch routing lines can be prevented.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
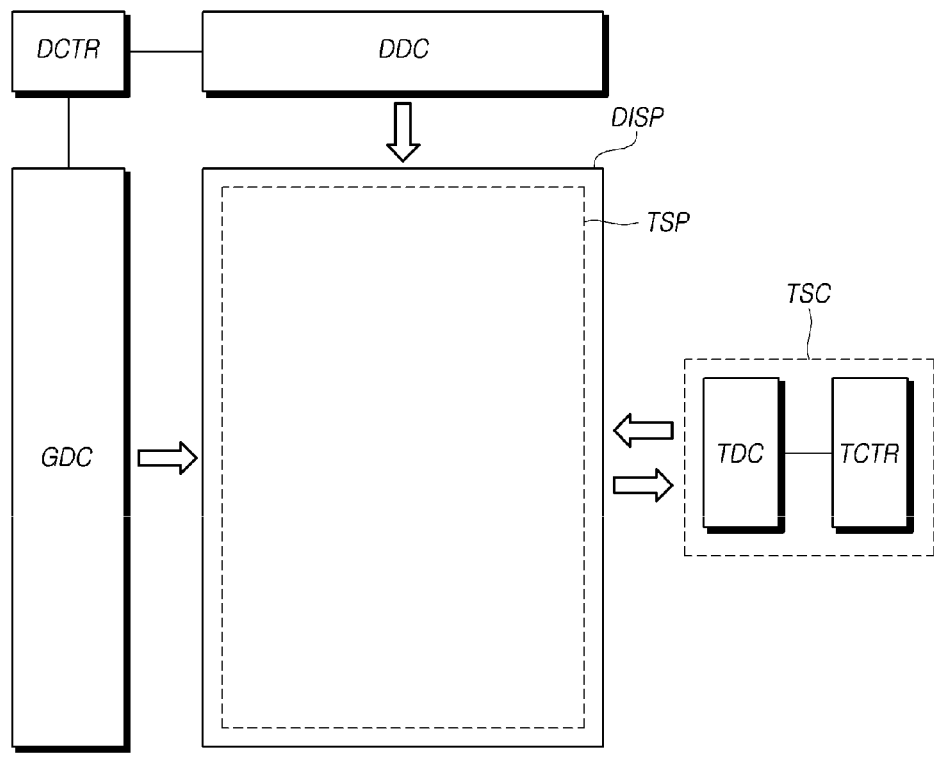
FIG. 1 is a diagram illustrating a system configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a diagram illustrating a system configuration of a touch display device according to embodiments.

Referring to FIG. 1, the touch display device according to embodiments of the present disclosure can provide both an image display function and a touch-sensing function.

To provide the image display function, the touch display device according to embodiments of the present disclosure can comprise: a display panel DISP in which a plurality of data lines and a plurality of gate lines are disposed and a plurality of subpixels defined by the plurality of data lines and the plurality of gate lines are arrayed; a data driver (or data driver circuit) DDC driving the plurality of data lines; a gate driver (or gate driver circuit) GDC driving the plurality of gate lines; a display controller DCTR controlling the data driver DDC and gate driver GDC, and the like.

Each of the data driver DDC, the gate driver GDC, and the display controller DCTR can be implemented as one or more separate components. In some cases, two or more of the data driver DDC, the gate driver GDC, and the display controller DCTR can be integrated into a single component. For example, the data driver DDC and the display controller DCTR can be implemented as a single integrated circuit (IC) chip.

To provide the touch-sensing function, the touch display device according to embodiments of the present disclosure can comprise: a touch panel TSP including a plurality of touch electrodes; and a touch-sensing circuit TSC supplying a touch driving signal to the touch panel TSP, detecting a touch-sensing signal from the touch panel TSP, and detecting a touch of a user or determining a touch position (touch coordinates) on the touch panel TSP on the basis of a detected touch-sensing signal.

For example, the touch-sensing circuit TSC can comprise: a touch driving circuit TDC supplying a touch driving signal to the touch panel TSP and detecting a touch-sensing signal from the touch panel TSP; a touch controller TCTR determining at least one of the touch of the user and the touch coordinates on the basis of the touch-sensing signal detected by the touch driving circuit TDC, and the like.

The touch driving circuit TDC can comprise a first circuit part supplying the touch driving signal to the touch panel TSP and a second circuit part detecting the touch-sensing signal from the touch panel TSP.

The touch driving circuit TDC and the touch controller TCTR can be provided as separate components or, in some cases, can be integrated into a single component.

In addition, each of the data driver DDC, the gate driver GDC, and the touch driving circuit TDC is implemented as one or more ICs, and in terms of electrical connection to the display panel DISP, can have a chip-on-glass (COG) structure, a chip-on-film (COF) structure, a tape carrier package (TCP) structure, or the like. In addition, the gate driver GDC can have a gate-in-panel (GIP) structure.

In addition, each of the circuit configurations DDC, GDC, and DCTR for display driving and the circuit configurations TDC and TCTR for touch sensing can be implemented as one or more separate components. In some cases, one or more of the display driving circuit configurations DDC, GDC, and DCTR and one or more of the touch-sensing circuit configurations TDC and TCTR can be functionally integrated into one or more components.

For example, the data driver DDC and the touch driving circuit TDC can be integrated into one or more IC chips. In a case in which the data driver DDC and the touch driving circuit TDC are integrated into two or more IC chips, each of the two or more IC chips can have both a data driving function and a touch driving function.

In addition, the touch display device according to embodiments of the present disclosure can be various types of devices, such as an organic light-emitting diode (OLED) display device and a liquid crystal display (LCD) device. Hereinafter, the touch display device will be described as an OLED display device for the sake of brevity. That is, although the display panel DISP can be various types of devices, such as an OLED and an LCD, the display panel DISP will be described as an OLED panel as an example for the sake of brevity.

In addition, as will be described later, the touch panel TSP can comprise a plurality of touch electrodes to which the touch driving signal is applicable or from which the touch-sensing signal is detectable; a plurality of touch routing lines connecting the plurality of touch electrodes to the touch driving circuit TDC; and the like.

The touch panel TSP can be located outside of the display panel DISP. That is, the touch panel TSP and the display panel DISP can be fabricated separately and combined thereafter. Such a touch panel TSP is referred to as an add-on touch panel.

Alternatively, the touch panel TSP can be disposed inside of the display panel DISP. That is, when the display panel DISP is fabricated, touch sensor structures of the touch panel TSP, including the plurality of touch electrodes, the plurality of touch routing lines, and the like, can be provided together with electrodes and signal lines used for the display driving. Such a touch panel TSP is referred to as an in-cell touch panel. Hereinafter, for the sake of brevity, the touch panel TSP will be described as an in-cell touch panel TSP as an example.

Figure 2:
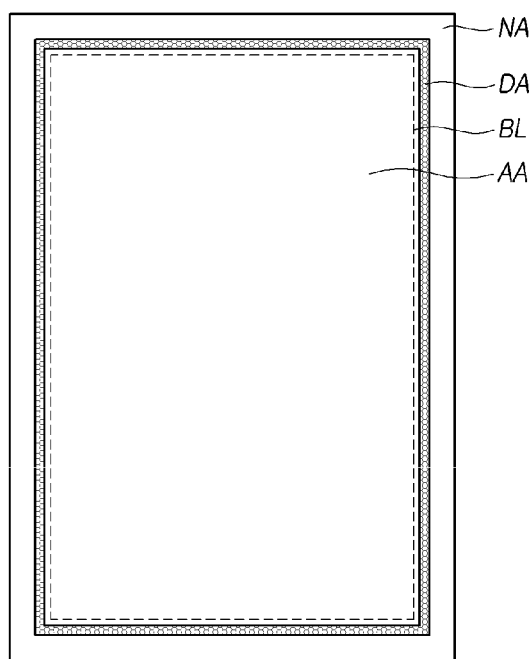
FIG. 2 is a diagram schematically illustrating a display panel of a touch display device according to embodiments of the present disclosure.

FIG. 2 is a diagram schematically illustrating the display panel DISP of the touch display device according to embodiments of the present disclosure.

Referring to FIG. 2, the display panel DISP can comprise an active area AA on which images are displayed and a non-active area NA located outside of an outer boundary line BL of the active area AA.

In the active area AA of the display panel DISP, a plurality of subpixels for displaying images are arrayed, and a variety of electrodes and signal lines for the display driving area are disposed.

In addition, the plurality of touch electrodes for the touch sensing, the plurality of touch routing lines electrically connected to the plurality of touch electrodes, and the like can be disposed in the active area AA of the display panel DISP. Accordingly, the active area AA can also be referred to as a touch-sensing area in which the touch sensing can be performed.

In the non-active area NA of the display panel DISP, link lines produced by extending a variety of signal lines disposed in the active area AA or link lines electrically connected to the variety of signal lines disposed in the active area AA and pads electrically connected to the link lines can be disposed. The pads disposed in the non-active area NA can be bonded or electrically connected to the display driving circuits, such as DDC and GDC.

In addition, in the non-active area NA of the display panel DISP, link lines produced by extending a plurality of touch routing lines disposed in the active area AA or link lines electrically connected to the plurality of touch routing lines disposed in the active area AA and pads electrically connected to the link lines can be disposed. The pads disposed in the non-active area NA can be bonded or electrically connected to the touch driving circuit TDC.

In the non-active area NA, portions produced by expanding portions of the outermost touch electrodes among the plurality of touch electrodes disposed in the active area AA can be provided, and one or more electrodes (e.g., touch electrodes) made of the same material as the plurality of touch electrodes disposed in the active area AA can be further disposed.

That is, the entirety of the plurality of touch electrodes disposed in the display panel DISP can be located in the active area AA, specific touch electrodes (e.g., the outermost touch electrodes) among the plurality of touch electrodes disposed in the display panel DISP can be located in the non-active area NA, or specific touch electrodes (e.g., the outermost touch electrodes) among the plurality of touch electrodes disposed in the display panel DISP can extend across at least a portion of the active area AA and at least a portion of the non-active area NA.

In addition, referring to FIG. 2, the display panel DISP of the touch display device according to embodiments of the present disclosure can comprise a dam area DA in which a dam DAM (see FIG. 9) is disposed, the dam DAM serving to prevent a layer (e.g., an encapsulation layer in the OLED display panel) in the active area AA from collapsing.

The dam area DA can be located at the boundary between the active area AA and the non-active area NA, in a location of the non-active area NA at the periphery of the active area AA, or the like.

The dam disposed in the dam area DA can be disposed to surround the active area AA in all directions or only at the periphery of one or more portions (i.e., portions in which a fragile layer is located) of the active area AA.

The dams disposed in the dam area DA can be connected to be made as a single pattern or to be made as two or more separate patterns. In addition, in the dam area DA, only a first dam can be disposed, or two dams (i.e., a first dam and a second dam) can be disposed, or three or more dams can be disposed.

In the dam area DA, the first dam can only be provided in one direction, and both the first dam and the second dam can be provided in the other direction.

Figure 3:
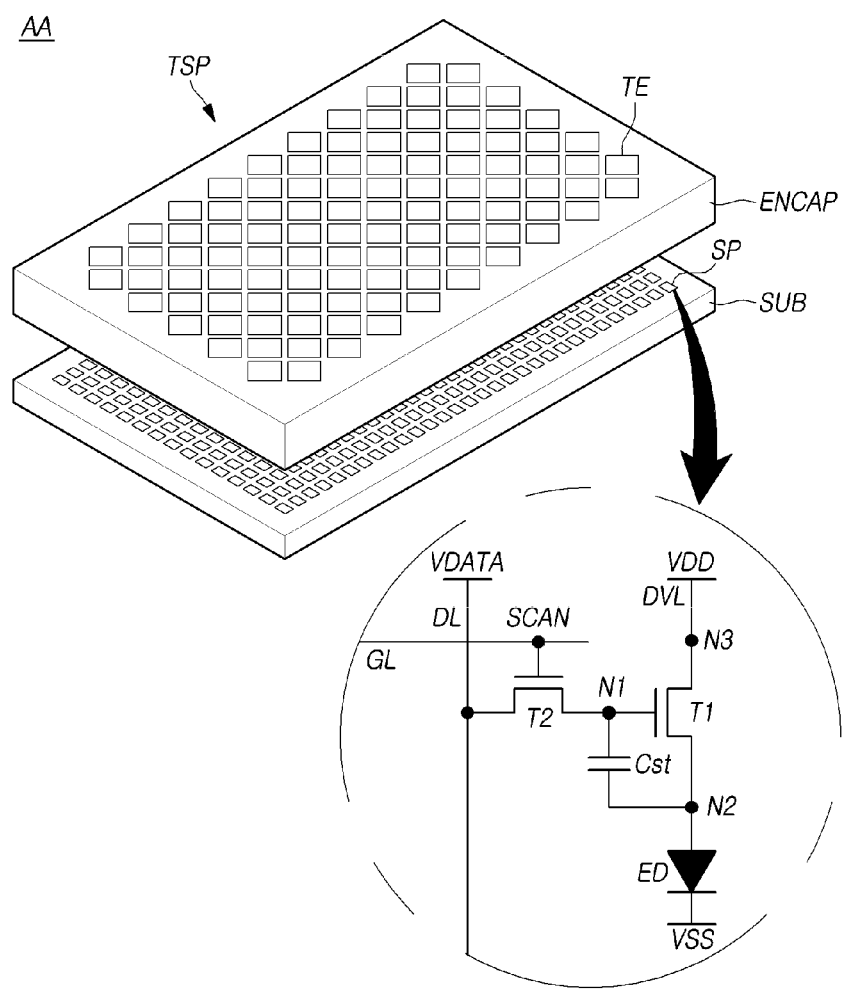
FIG. 3 is a diagram illustrating a structure in which a touch panel is disposed as an in-cell structure in a display panel according to embodiments of the present disclosure.

FIG. 3 is a diagram illustrating a structure in which the touch panel TSP is disposed as an in-cell structure in the display panel DISP according to embodiments of the present disclosure.

Referring to FIG. 3, a plurality of subpixels SP are arrayed on a substrate SUB in the active area AA of the display panel DISP.

Each of the subpixels SP can comprise an emitting device ED, a first transistor T1 driving the emitting device ED, a second transistor T2 delivering a data voltage VDATA to a first node N1 of the first transistor T1, a storage capacitor Cst maintaining a predetermined voltage for a single frame, and the like.

The first transistor T1 can comprise the first node N1 to which the data voltage VDATA is applicable, a second node N2 electrically connected to the emitting device ED, and a third node N3 to which a driving voltage is applied from a driving voltage line DVL. The first node N1 can be a gate node, the second node N2 can be a source node or a drain node, and the third node N3 can be a drain node or a source node. Such a first transistor T1 is also referred to as a driving transistor driving the emitting device ED.

The emitting device ED can comprise a first electrode (e.g., an anode), an emissive layer, and a second electrode (e.g., a cathode). The first electrode can be electrically connected to the second node N2 of the first transistor T1, and the second electrode can have a base voltage VSS applied thereto.

The emissive layer of the emitting device ED can be an organic emissive layer containing an organic material. In this case, the emitting device ED can be an organic light-emitting diode (OLED).

The second transistor T2 can be on/off controlled by a scan signal SCAN applied through a gate line GL and be electrically connected to the first node N1 of the first transistor T1 and a data line DL. Such a second transistor T2 is also referred to as a switching transistor.

When the second transistor T2 is turned on by the scan signal SCAN, the second transistor T2 delivers the data voltage VDATA supplied through the data line DL to the first node N1 of the first transistor T1.

The storage capacitor Cst can be electrically connected to the first node N1 and the second node N2 of the first transistor T1.

As illustrated in FIG. 3, each of the subpixels SP can have a 2T1C comprised of two transistors T1 and T2 and a single capacitor Cst. In some cases, each of the subpixels SP can further comprise one or more transistors or one or more capacitors.

The storage capacitor Cst can be an external capacitor intentionally designed to be disposed externally of the first transistor T1, rather than a parasitic capacitor (e.g., Cgs or Cgd), i.e., an internal capacitor present between the first node N1 and the second node N2 of the first transistor T1.

Each of the first transistor T1 and the second transistor T2 can be an n-type transistor or a p-type transistor.

As described above, circuit components, including the emitting device ED, two or more transistors T1 and T2, and one or more capacitor Cst, are disposed in the display panel DISP. Since such circuit components (in particular, the emitting device ED) are vulnerable to external moisture, oxygen, or the like, an encapsulation layer ENCAP preventing or at least reducing external moisture or oxygen from penetrating the circuit elements (in particular, the emitting device ED) can be disposed in the display panel DISP.

Such an encapsulation layer ENCAP can be a single layer or have a multilayer structure.

In addition, in the touch display device according to embodiments of the present disclosure, the touch panel TSP can be disposed on the encapsulation layer ENCAP.

That is, in the touch display device, a touch sensor structure, including the plurality of touch electrodes TE, of the touch panel TSP can be disposed on the encapsulation layer ENCAP.

In the touch sensing, the touch driving signal or the touch-sensing signal can be applied to the touch electrodes TE. Then, in the touch sensing, a potential difference can be produced between a touch electrode TE and a cathode disposed on both sides of the encapsulation layer ENCAP, thereby generating unnecessary parasitic capacitance. Since such parasitic capacitance can reduce touch sensitivity, the distance between the touch electrode TE and the cathode can be designed to be a predetermined value (e.g., 1 μm) or more in consideration of the thickness of the panel, a panel fabrication process, display performance, and the like in order to reduce the parasitic capacitance. In this regard, for example, the thickness of the encapsulation layer ENCAP can be designed to be 1 μm or more.

Figure 4:
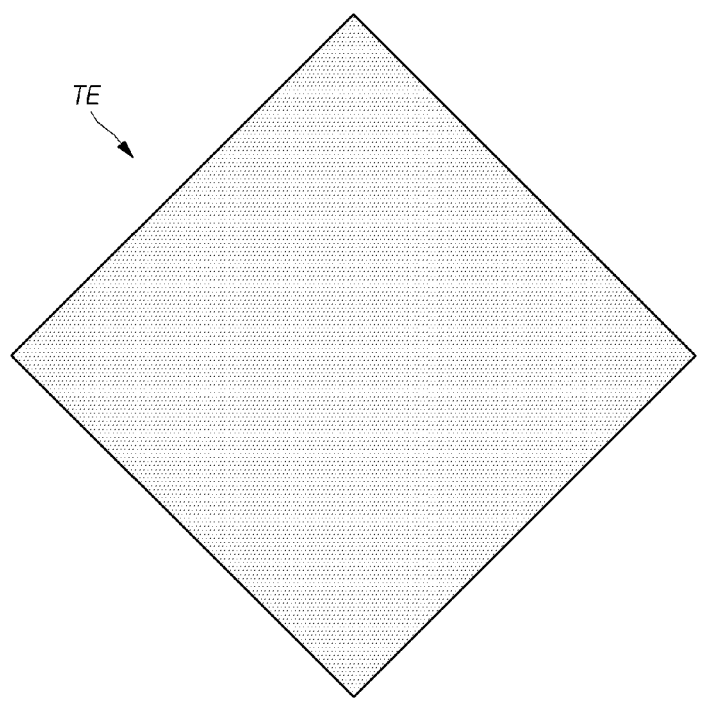
FIGS. 4 and 5 are diagrams illustrating types of touch electrodes disposed in a display panel according to embodiments of the present disclosure.
Figure 5:
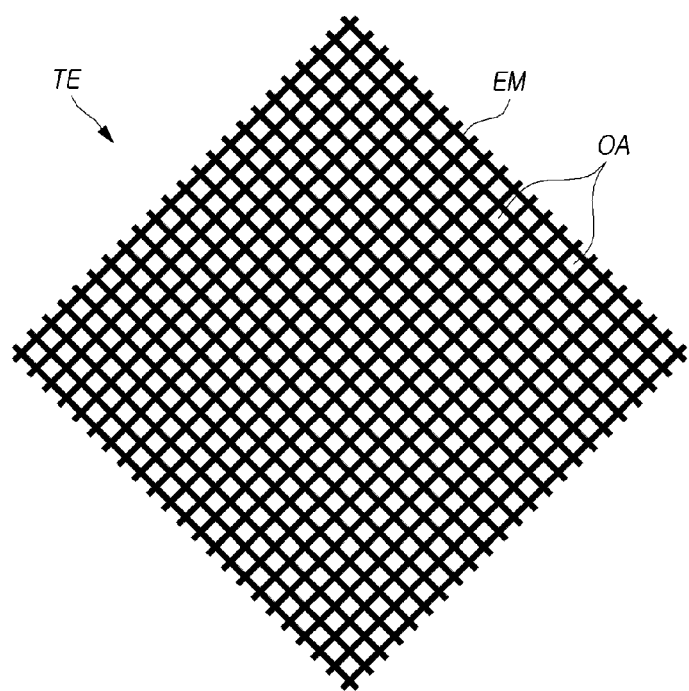

FIGS. 4 and 5 are diagrams illustrating types of touch electrodes TE disposed in the display panel DISP according to embodiments of the present disclosure.

As illustrated in FIG. 4, each of the touch electrodes TE disposed in the display panel DISP can be a plate-shaped electrode metal without an open area. In this case, each of the touch electrodes TE can be a transparent electrode. That is, each of the touch electrodes TE can be made of a transparent electrode material such that light emitted by the plurality of subpixels SP disposed below the touch electrodes TE can pass through the touch electrodes TE.

Alternatively, as illustrated in FIG. 5, each of the touch electrodes TE disposed in the display panel DISP can be an electrode metal EM in the shape of a patterned mesh having two or more open areas OA.

The electrode metal EM is a portion substantially corresponding to the touch electrode TE and is a portion to which the touch driving signal is applied or from which the touch-sensing signal is detected.

As illustrated in FIG. 5, in a case in which each of the touch electrodes TE is the electrode metal EM in the shape of a patterned mesh, two or more open areas OA can be present in the area of the touch electrode TE.

Each of the plurality of open areas OA provided in each of the touch electrodes TE can correspond to the emitting area of one or more subpixels SP. That is, the plurality of open areas OA are passages allowing light emitted from the plurality of subpixels SP located there below to pass upward therethrough. Hereinafter, for the sake of brevity, each of the touch electrodes TE will be described as a mesh-shaped electrode metal EM as an example.

The electrode metal EM corresponding to each of the touch electrodes TE can be located on a bank disposed in an area, except for the emitting area of two or more subpixels SP.

In addition, a method of fabricating a plurality of touch electrode TE can comprise making a mesh-shaped electrode metal EM having a wider area and then cutting the electrode metal EM to be made as a predetermined pattern such that portions of the electrode metal EM are electrically separated from each other, thereby fabricating a plurality of touch electrodes TE.

The outline of the touch electrode TE can have a rectangular shape, such as a diamond or a rhombus shape, as illustrated in FIGS. 4 and 5, or a variety of other shapes, such as a triangle, a pentagon, or a hexagon.

Figure 6:
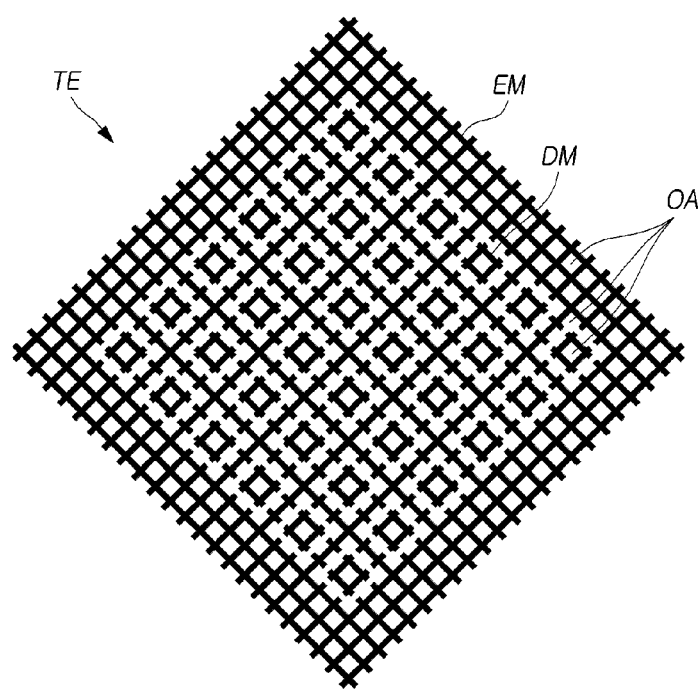
FIG. 6 is a diagram illustrating the mesh-shaped touch electrode illustrated in FIG. 5 according to embodiments of the present disclosure.

FIG. 6 is a diagram illustrating the mesh-shaped touch electrode TE illustrated in FIG. 5 according to one embodiment.

Referring to FIG. 6, in the area of each of the touch electrodes TE, one or more dummy metals DM disconnected from the mesh-shaped electrode metal EM can be provided.

The electrode metal EM is a portion substantially corresponding to the touch electrode TE and is a portion to which the touch driving signal is applied or from which the touch-sensing signal is detected. In contrast, the dummy metals DM are portions to which the touch driving signal is not applied and from which the touch-sensing signal is not detected, although the dummy metals DM are portions located in the area of the touch electrode TE. That is, the dummy metals DM can be electrically floating metals.

Thus, the electrode metal EM can be electrically connected to the touch driving circuit TDC, but none of the dummy metals DM are electrically connected to the touch driving circuit TDC.

In the area of each of the entire touch electrodes TE, one or more dummy metals DM can be provided while being disconnected from the electrode metals EM.

Alternatively, one or more dummy metals DM can be provided in the area of each of specific touch electrodes TE among the entire touch electrodes TE while being disconnected from the electrode metal EM. That is, no dummy metals DM can be provided in the areas of the other touch electrodes TE.

The function of the dummy metals DM is related to a visibility issue. In a case in which only the mesh-shaped electrode metal EM is present in the area of the touch electrode TE without one or more dummy metals DM being present in the area of the touch electrode TE as illustrated in FIG. 5, the outline of the electrode metal EM can appear on the screen, thereby causing a visibility issue.

In contrast, in a case in which one or more dummy metals DM are present in the area of the touch electrode TE as illustrated in FIG. 6, the outline of the electrode metal EM appearing on the screen, i.e., the visibility issue, can be prevented or at least reduced.

In addition, touch sensitivity can be improved by adjusting the magnitude of capacitance according to each of the touch electrodes TE by adjusting the presence or absence or the number (or ratio) of the dummy metals DM of each of the touch electrodes TE.

In addition, specific points of the electrode metal EM provided in the area of a single touch electrode TE can be cut, so that the cut electrode metal EM form dummy metals DM. That is, the electrode metal EM and the dummy metals DM can be made of the same material provided on the same layer.

In addition, the touch display device according to embodiments of the present disclosure can detect a touch on the basis of capacitance generated on the touch electrode TE.

The touch display device according to embodiments of the present disclosure can detect a touch by a capacitance-based touch sensing method, more particularly, mutual capacitance-based touch sensing or self-capacitance-based touch sensing.

In the mutual capacitance-based touch sensing, the plurality of touch electrodes TE can be divided into driving touch electrodes (or transmitting touch electrodes) to which the touch driving signal is applied and sensing touch electrodes (or receiving touch electrodes) detecting the touch sensing signal and generating capacitance together with the driving touch electrodes.

In the mutual capacitance-based touch sensing, the touch-sensing circuit TSC detects a touch and determines touch coordinates on the basis of changes in the capacitance (i.e., mutual capacitance) occurring between the driving touch electrodes and the sensing touch electrodes, depending on the presence or absence of a pointer, such as a finger or a pen.

In the self-capacitance-based touch sensing, each of the touch electrodes TE serves as both a driving touch electrode and a sensing touch electrode. That is, the touch-sensing circuit TSC detects a touch and determines touch coordinates by applying the touch driving signal to one or more touch electrodes TE, detecting the touch-sensing signal through the touch electrode TE to which the touch driving signal is applied, and recognizing changes in the capacitance between the pointer, such as a finger or a pen, and the touch electrode TE, on the basis of the detected touch-sensing signal. Accordingly, in the self-capacitance-based touch sensing, there is no difference between the driving touch electrodes and the sensing touch electrodes.

As described above, the touch display device according to embodiments of the present disclosure can perform the touch sensing by the mutual capacitance-based touch sensing or the self-capacitance-based touch sensing. Hereinafter, for the sake of brevity, the touch display device performing the mutual capacitance-based touch sensing and having a touch sensor structure for the mutual capacitance-based touch sensing will be described as an example.

Figure 7:
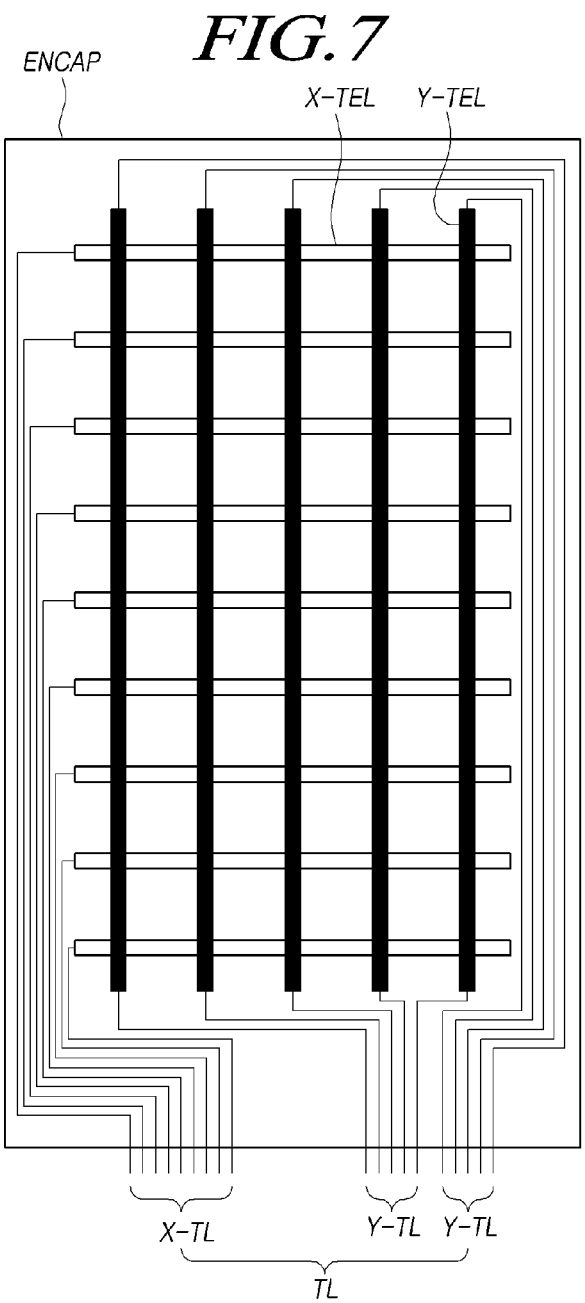
FIG. 7 is a diagram schematically illustrating a touch sensor structure in a display panel according to embodiments of the present disclosure.
Figure 8:
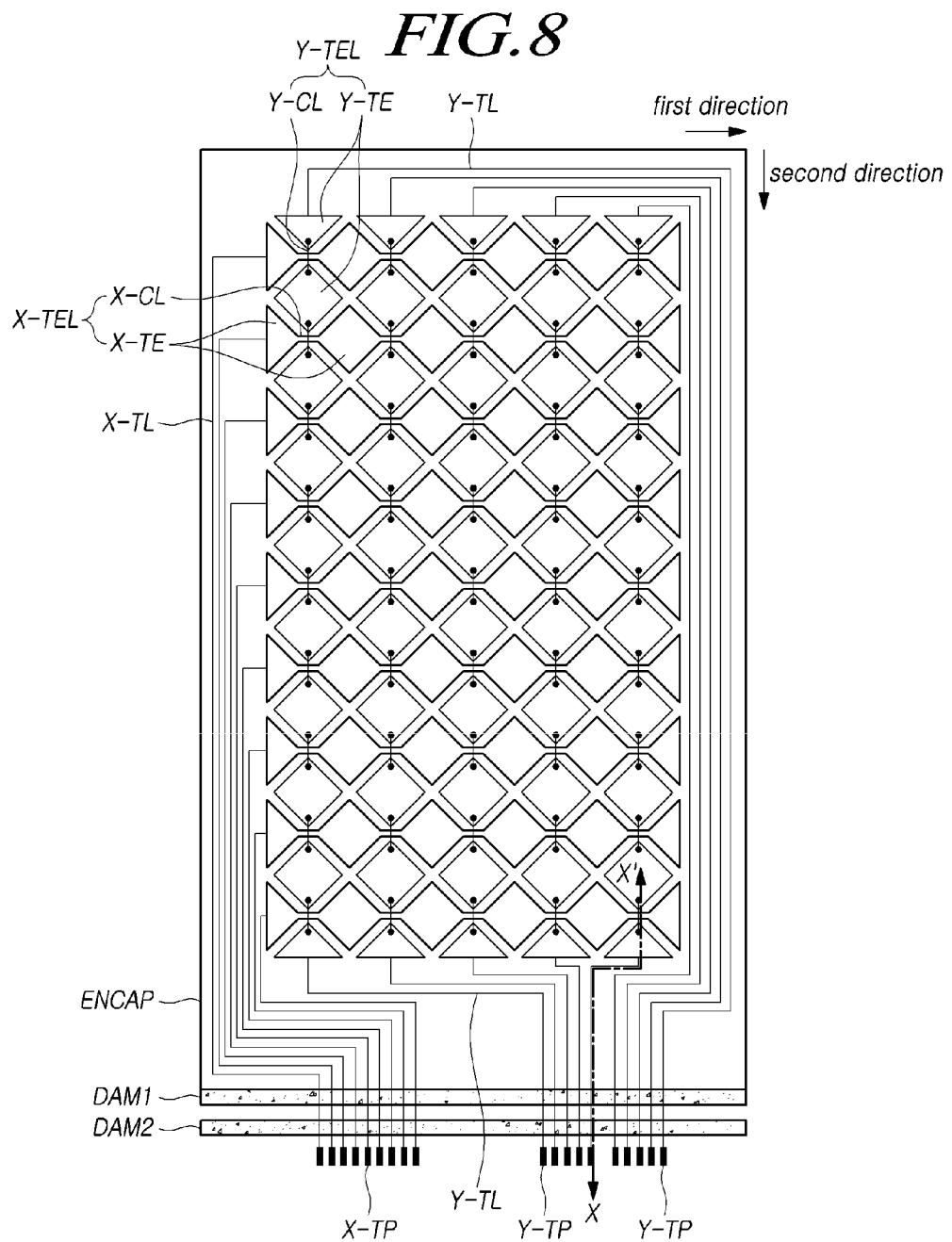
FIG. 8 is a diagram illustrating an example of the touch sensor structure illustrated in FIG. 7 according to embodiments of the present disclosure.

FIG. 7 is a diagram schematically illustrating a touch sensor structure in the display panel DISP according to embodiments of the present disclosure, and FIG. 8 is a diagram illustrating an example of the touch sensor structure illustrated in FIG. 7.

Referring to FIG. 7, the touch sensor structure for the mutual capacitance-based touch sensing can comprise a plurality of X-touch electrode lines X-TEL and a plurality of Y-touch electrode lines Y-TEL. Here, the plurality of X-touch electrode lines X-TEL and the plurality of Y-touch electrode lines Y-TEL are located on the encapsulation layer ENCAP.

Each of the plurality of X-touch electrode lines X-TEL can be disposed in a first direction, and the plurality of Y-touch electrode lines Y-TEL can be disposed in a second direction different from the first direction.

Herein, the first direction and the second direction can be different directions. For example, the first direction can be the X-axis direction, while the second direction can be the Y-axis direction. Alternatively, the first direction can be the Y-axis direction, while the second direction can be the X-axis direction. In addition, the first direction and the second direction can or cannot intersect perpendicularly. In addition, the terms "column" and "row" as used herein are relative terms. The column and the row can be switched depending on the viewing perspective.

Each of the plurality of X-touch electrode lines X-TEL can be comprised of a plurality of X-touch electrodes X-TE electrically connected to each other. Each of the plurality of Y-touch electrode lines Y-TEL can be comprised of a plurality of Y-touch electrodes Y-TE electrically connected to each other.

Here, the plurality of X-touch electrodes X-TE and the plurality of Y-touch electrodes Y-TE are electrodes included in the plurality of touch electrodes TE, and have different functions.

For example, the plurality of X-touch electrodes X-TE constituting each of the plurality of X-touch electrode lines X-TEL can be the driving touch electrodes, while the plurality of Y-touch electrodes Y-TE constituting each of the plurality of Y-touch electrode lines Y-TEL can be the sensing touch electrodes. In this case, each of the plurality of X-touch electrode lines X-TEL corresponds to a driving touch electrode lines, and each of the plurality of Y-touch electrode lines Y-TEL corresponds to a sensing touch electrode line.

Alternatively, the plurality of X-touch electrodes X-TE constituting each of the plurality of X-touch electrode lines X-TEL can be the sensing touch electrodes, while the plurality of Y-touch electrodes Y-TE constituting each of the plurality of Y-touch electrode lines Y-TEL can be the driving touch electrodes. In this case, each of the plurality of X-touch electrode lines X-TEL corresponds to the sensing touch electrode line, and each of the plurality of Y-touch electrode lines Y-TEL corresponds to the driving touch electrode line.

A touch sensor metal TSM for the touch sensing can comprise a plurality of touch routing lines TL in addition to the plurality of X-touch electrode lines X-TEL and the plurality of Y-touch electrode lines Y-TEL.

The plurality of touch routing lines TL can comprise one or more X-touch routing lines X-TL connected to the plurality of X-touch electrode lines X-TEL, respectively, and one or more Y-touch routing lines Y-TL connected to the plurality of Y-touch electrode lines Y-TEL, respectively.

Referring to FIG. 8, each of the plurality of X-touch electrode lines X-TEL can comprise a plurality of X-touch electrodes X-TE disposed in the same row (or column) and one or more X-touch electrode connecting lines X-CL electrically connecting the plurality of X-touch electrodes X-TE. Here, the X-touch electrode connecting lines X-CL respectively connecting two adjacent X-touch electrodes X-TE can be metals integrated with the two adjacent X-touch electrodes X-TE (see FIG. 8) or metals connected to the two adjacent X-touch electrodes X-TE via contact holes.

Each of the plurality of Y-touch electrode lines Y-TEL can comprise a plurality of Y-touch electrodes Y-TE disposed in the same column (or row) and one or more Y-touch electrode connecting lines Y-CL electrically connecting the plurality of Y-touch electrodes Y-TE. Here, the Y-touch electrode connecting lines Y-CL respectively connecting two adjacent Y-touch electrodes Y-TE can be metals integrated with the two adjacent Y-touch electrodes Y-TE or metals connected to the two adjacent Y-touch electrodes Y-TE via contact holes (see FIG. 8).

In areas in which the X-touch electrode lines X-TEL intersect the Y-touch electrode lines Y-TEL (i.e., touch electrode line intersecting areas), the X-touch electrode connecting lines X-CL can intersect the Y-touch electrode connecting lines Y-CL.

In a case in which the X-touch electrode connecting lines X-CL intersect the Y-touch electrode connecting lines Y-CL in the touch electrode line intersecting areas as described above, the X-touch electrode connecting lines X-CL must be located on a layer different from that of the Y-touch electrode connecting lines Y-CL.

Accordingly, the plurality of X-touch electrodes X-TE, the plurality of X-touch electrode connecting lines X-CL, the plurality of Y-touch electrodes Y-TE, the plurality of Y-touch electrode lines Y-TEL, and the plurality of Y-touch electrode connecting lines Y-CL can be located on two or more layers, such that the plurality of X-touch electrode lines X-TEL intersect the plurality of Y-touch electrode lines Y-TEL.

Referring to FIG. 8, each of the plurality of X-touch electrode lines X-TEL is electrically connected to a corresponding X-touch pad X-TP through one or more X-touch routing lines X-TL. That is, the outermost X-touch electrode X-TE among the plurality of X-touch electrodes X-TE included in a single X-touch electrode line X-TEL is electrically connected to a corresponding X-touch pad X-TP via the X-touch routing line X-TL.

Each of the plurality of Y-touch electrode lines Y-TEL is electrically connected to corresponding Y-touch pads Y-TP through one or more Y-touch routing lines Y-TL. That is, the outermost Y-touch electrodes Y-TE among the plurality of Y-touch electrodes Y-TE included in a single Y-touch electrode line Y-TEL is electrically connected to the corresponding Y-touch pads Y-TP through the Y-touch routing lines Y-TL.

In addition, as illustrated in FIG. 8, the plurality of X-touch electrode lines X-TEL and the plurality of Y-touch electrode lines Y-TEL can be disposed on the encapsulation layer ENCAP. That is, the plurality of X-touch electrodes X-TE, constituting the plurality of X-touch electrode lines X-TEL, and the plurality of X-touch electrode connecting lines X-CL can be disposed on the encapsulation layer ENCAP. The plurality of Y-touch electrodes Y-TE, constituting the plurality of Y-touch electrode lines Y-TEL, and the plurality of Y-touch electrode connecting lines Y-CL can be disposed on the encapsulation layer ENCAP.

In addition, as illustrated in FIG. 8, the plurality of X-touch routing lines X-TL electrically connected to the plurality of X-touch electrode lines X-TEL can be disposed on the encapsulation layer ENCAP and extend to a location in which the encapsulation layer ENCAP is not provided, thereby being electrically connected to a plurality of X-touch pads X-TP, respectively. The plurality of Y-touch routing lines Y-TL electrically connected to the plurality of Y-touch electrode lines Y-TEL can be disposed on the encapsulation layer ENCAP and extend to a location in which encapsulation layer ENCAP is not provided, thereby being electrically connected to a plurality of Y-touch pads Y-TP, respectively. Here, the encapsulation layer ENCAP can be located in the active area AA and, in some cases, can expand to the non-active area NA.

In addition, as described above, a dam area DA can be provided at the boundary between the active area AA and the non-active area NA or in the non-active area NA at the periphery of the active area AA in order to prevent a layer (e.g., an encapsulation in the OLED display panel) in the active area AA from collapsing.

As illustrated in FIG. 8, for example, a first dam DAM1 and a second dam DAM2 can be disposed in the dam area DA. Here, the second dam DAM2 can be located more outward than the first dam DAM1.

In a manner different from that illustrated in FIG. 8, only the first dam DAM1 can be located in the dam area DA. In some cases, not only the first dam DAM1 and the second dam DAM2, but also one or more additional dam can be disposed in the dam area DA.

Referring to FIG. 8, the encapsulation layer ENCAP can be located on a side of the first dam DAM1 or be located both on a side of and above the first dam DAM1.

Figure 9:
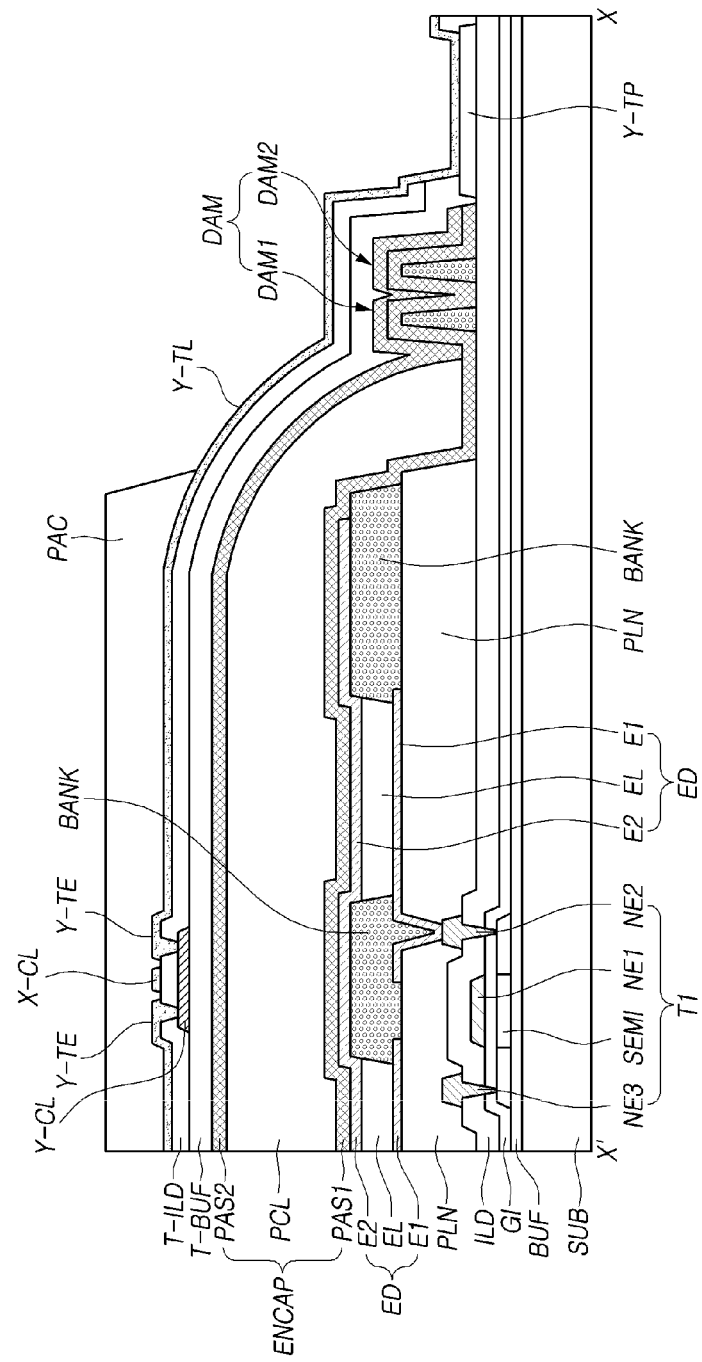
FIG. 9 is a cross-sectional diagram illustrating portions of the display panel taken along line X-X' in FIG. 8 according to embodiments of the present disclosure.

FIG. 9 is a cross-sectional diagram illustrating portions of the display panel DISP, taken along line X-X' in FIG. 8 according to embodiments of the present disclosure. In FIG. 9, the touch electrode TE is illustrated in the shape of a plate. However, this is illustrative only, and the touch electrode TE can be mesh shaped. In a case in which the touch electrode TE is mesh shaped, the open areas OA of the touch electrode TE can be located above the emissive areas of subpixels SP.

The first transistor T1, i.e., the driving transistor in each of the subpixels SP in the active area AA, is disposed on the substrate SUB.

The first transistor T1 comprises a first node electrode NE1 corresponding to the gate electrode, a second node electrode NE2 corresponding to a source electrode or a drain electrode, a third node electrode NE3 corresponding to a drain electrode or a source electrode, a semiconductor layer SEMI, and the like.

The first node electrode NE1 and the semiconductor layer SEMI can be located on both sides of a gate insulating film GI to overlap each other. The second node electrode NE2 can be provided on an insulating layer ILD to be in contact with one side of the semiconductor layer SEMI, while the third node electrode NE3 can be provided on the insulating layer ILD to be in contact with the other side of the semiconductor layer SEMI.

The emitting device ED can comprise a first electrode E1 corresponding to an anode (or cathode), an emitting layer EL provided on the first electrode E1, a second electrode E2 corresponding to a cathode (or anode) provided on the emitting layer EL, and the like.

The first electrode E1 is electrically connected to the second node electrode NE2 of the first transistor T1, exposed through a pixel contact hole extending through a planarization layer PLN.

The emitting layer EL is provided on the first electrode E1 in the emitting area provided by banks BANK. The emitting layer EL is provided on the first electrode E1 and is comprised of a hole-related layer, an emissive layer, and an electron-related layer stacked in the stated order or inversely. The second electrode E2 is provided on the side of the emitting layer EL opposite to the first electrode E1.

The encapsulation layer ENCAP prevents or at least reduces external moisture or oxygen from penetrating the emitting device ED vulnerable to external moisture, oxygen, or the like.

The encapsulation layer ENCAP can be a single layer or, as illustrated in FIG. 9, be comprised of a plurality of layers PAS1, PCL, and PAS2.

For example, in a case in which the encapsulation layer ENCAP is comprised of the plurality of layers PAS1, PCL, and PAS2, the encapsulation layer ENCAP can comprise one or more inorganic encapsulation layers PAS1 and PAS2 and one or more organic encapsulation layers PCL. As a specific example, the encapsulation layer ENCAP can have a structure in which the first inorganic encapsulation layer PAS1, the organic encapsulation layer PCL, and the second inorganic encapsulation layer PAS2 are stacked in order.

Here, the organic encapsulation layer PCL can further comprise at least one organic encapsulation layer or at least one inorganic encapsulation layer.

The first inorganic encapsulation layer PAS1 is provided on the substrate SUB, on which the second electrode E2 corresponding to the cathode is provided, so as to be closest to the emitting device ED. The first inorganic encapsulation layer PAS1 is made of an inorganic insulating material, such as silicon nitride (SiNx), silicon oxide (SiOx), silicon oxynitride (SiON), or aluminum oxide ($Al_2O_3$), which can be deposited at a low temperature. Since the first inorganic encapsulation layer PAS1 is deposited in a low-temperature atmosphere, the first inorganic encapsulation layer PAS1 can prevent the emitting layer EL containing an organic material vulnerable to a high-temperature atmosphere from being damaged during deposition processing.

The organic encapsulation layer PCL can be provided in an area smaller than the area of the first inorganic encapsulation layer PAS1. In this case, the organic encapsulation layer PCL can be configured to expose both edges of the first inorganic encapsulation layer PAS1. The organic encapsulation layer PCL can serve as a buffer to reduce stress between the layers caused by bending of the touch display device and serve to enhance planarization performance. The organic encapsulation layer PCL can be made of, for example, an organic insulating material, such as an acrylic resin, an epoxy resin, polyimide, polyethylene, silicon oxycarbon (SiOC).

In addition, in a case in which the organic encapsulation layer PCL is fabricated by inkjet printing, one or more dams DAM can be provided in the dam area DA corresponding to the boundary between the non-active area NA and the active area AA or a portion of the non-active area NA.

For example, as illustrated in FIG. 9, the dam area DA is located between a pad area in the non-active area NA and the active area AA. The pad area refers to a portion of the non-active area NA in which the plurality of X-touch pads X-TP and the plurality of Y-touch pads Y-TP are provided. In the dam area DA, the first dam DAM1 adjacent to the active area AA and the second dam DAM2 adjacent to the pad area can be provided.

The one or more dams DAM disposed in the dam area DA can prevent or at least reduce the organic encapsulation layer PCL in a liquid form from collapsing (e.g., extending) in the direction of the non-active area NA and penetrating into the pad area when the organic encapsulation layer PCL in the liquid form is dropped to the active area AA.

This effect can be further increased by the provision of the first dam DAM1 and the second dam DAM2 as illustrated in FIG. 9.

At least one of the first dam DAM1 and the second dam DAM2 can have a single layer or multilayer structure. For example, at least one of the first dam DAM1 and the second dam DAM2 can be simultaneously made of the same material as at least one of the banks BANK and spacers (not shown). In this case, a dam structure can be provided without additional mask processing or an increase in cost.

In addition, as illustrated in FIG. 9, at least one of the first dam DAM1 and the second dam DAM2 can have a structure in which at least one of the first inorganic encapsulation layer PAS1 and the second inorganic encapsulation layer PAS2 is stacked on the banks BANK.

In addition, the organic encapsulation layer PCL containing an organic material can be located on an inner side of the first dam DAM1, as illustrated in FIG. 9.

Alternatively, the organic encapsulation layer PCL containing an organic material can be located above at least a portion of the first dam DAM1 and the second dam DAM2. For example, the organic encapsulation layer PCL can be located above the first dam DAM1.

The second inorganic encapsulation layer PAS2 can be provided on the substrate SUB on which the organic encapsulation layer PCL is provided, so as to cover the top surfaces and side surfaces of the organic encapsulation layer PCL and the first inorganic encapsulation layer PAS1. The second inorganic encapsulation layer PAS2 reduces or prevents external moisture or oxygen from penetrating the first inorganic encapsulation layer PAS1 or the organic encapsulation layer PCL. The second inorganic encapsulation layer PAS2 is made of, for example, an inorganic insulating material, such as SiNx, SiOx, SiON, or $Al_2O_3$.

A touch buffer film T-BUF can be provided on the encapsulation layer ENCAP. The touch buffer film T-BUF can be located between the touch sensor metal TSM, including the X and Y-touch electrodes X-TE and Y-TE and X and Y-touch electrode connecting lines X-CL and Y-CL, and the second electrode E2 of the emitting device ED.

The touch buffer film T-BUF can be designed to maintain a predetermined minimum distance (e.g., 1 μm) between the touch sensor metal TSM and the second electrode E2 of the emitting device ED. Accordingly, this can reduce or prevent parasitic capacitance generated between the touch sensor metal TSM and the second electrode E2 of the emitting device ED, thereby preventing touch sensitivity from being reduced by the parasitic capacitance.

Without the touch buffer film T-BUF, the touch sensor metal TSM comprising the X and Y-touch electrodes X-TE and Y-TE and the X and Y-touch electrode connecting lines X-CL and Y-CL can be disposed on the encapsulation layer ENCAP.

In addition, the touch buffer film T-BUF can prevent or at least reduce the emitting layer EL containing the organic material from being penetrated by a chemical agent (e.g., a developing solution or an etching solution) used in fabrication processing of the touch sensor metal TSM disposed on the touch buffer film T-BUF, external moisture, or the like. Accordingly, the touch buffer film T-BUF can prevent the emitting layer EL vulnerable to the chemical agent or moisture from being damaged.

The touch buffer film T-BUF is made of an organic insulating material producible at a low temperature equal to or lower than a predetermined temperature (e.g., 100° C.) and having a low dielectric constant of 1 to 3 in order to prevent or at least reduce the emitting layer EL containing the organic material vulnerable to high temperature from being damaged. For example, the touch buffer film T-BUF can be made of an epoxy-based material or a siloxane-based material. The touch buffer film T-BUF made of an inorganic insulating material and having a planarization performance can prevent the layers PAS1, PCL, and PAS2 included in the encapsulation layer ENCAP from being damaged or the touch sensor metal TSM on the touch buffer film T-BUF from being fractured in response to the bending of the OLED display device.

According to the mutual capacitance-based touch sensor structure, the X-touch electrode lines X-TEL and the Y-touch electrode lines Y-TEL are disposed on the touch buffer film T-BUF, and the X-touch electrode lines X-TEL and the Y-touch electrode lines Y-TEL can be disposed such that the X-touch electrode lines X-TEL intersect the Y-touch electrode lines Y-TEL.

The Y-touch electrode lines Y-TEL can comprise the plurality of Y-touch electrodes Y-TE and the plurality of Y-touch electrode connecting lines Y-CL electrically connecting the plurality of Y-touch electrodes Y-TE.

As illustrated in FIG. 9, the plurality of Y-touch electrodes Y-TE and the plurality of Y-touch electrode connecting lines Y-CL can be disposed on different layers, on both sides of a touch insulating film T-ILD.

The plurality of Y-touch electrodes Y-TE can be spaced apart from each other by predetermined distances in the Y-axis direction. Each of the plurality of Y-touch electrodes Y-TE can be electrically connected to the other adjacent Y-touch electrodes Y-TE through the Y-touch electrode connecting lines Y-CL in the Y-axis direction.

The Y-touch electrode connecting lines Y-CL can be provided on the touch buffer film T-BUF and exposed through touch contact holes extending through the touch insulating film T-ILD to be electrically connected to the two adjacent Y-touch electrodes Y-TE in the Y-axis direction.

The Y-touch electrode connecting lines Y-CL can be disposed to overlap the banks BANK. Accordingly, the aperture ratio can be prevented from being decreased by the Y-touch electrode connecting lines Y-CL.

The X-touch electrode lines X-TEL can comprise the plurality of X-touch electrodes X-TE and the plurality of X-touch electrode connecting lines X-CL electrically connecting the plurality of X-touch electrodes X-TE. The plurality of X-touch electrodes X-TE and the plurality of X-touch electrode connecting line X-CL can be disposed on different layers, on both sides of the touch insulating film T-ILD.

The plurality of X-touch electrodes X-TE can be disposed on the touch insulating film T-ILD, spaced apart from each other by predetermined distances in the X-axis direction. Each of the plurality of X-touch electrodes X-TE can be electrically connected to the adjacent other X-touch electrodes X-TE through the X-touch electrode connecting lines X-CL in the X-axis direction.

The X-touch electrode connecting lines X-CL can be disposed on the same plane as the X-touch electrodes X-TE to be electrically connected to the two adjacent X-touch electrodes X-TE in the X-axis direction without separate contact holes or be integrated with the two adjacent X-touch electrodes X-TE in the X-axis direction.

The X-touch electrode connecting lines X-CL can be disposed to overlap the banks BANK. Accordingly, the aperture ratio can be prevented from being decreased by the X-touch electrode connecting lines X-CL.

In addition, the Y-touch electrode lines Y-TEL can be electrically connected to the touch driving circuit TDC through the Y-touch routing lines Y-TL and the Y-touch pads Y-TP. In the same manner, the X-touch electrode lines X-TEL can be electrically connected to the touch driving circuit TDC through the X-touch routing lines X-TL and the X-touch pads X-TP.

A pad cover electrode covering the X-touch pads X-TP and the Y-touch pads Y-TP can be further disposed.

The X-touch pads X-TP can be provided separately from the X-touch routing lines X-TL or be provided as extensions of the X-touch routing lines X-TL. The Y-touch pads Y-TP can be provided separately from the Y-touch routing lines Y-TL or be provided as extensions of the Y-touch routing lines Y-TL.

In a case in which the X-touch pads X-TP are extensions of the X-touch routing lines X-TL and the Y-touch pads Y-TP are extensions of the Y-touch routing lines Y-TL, the X-touch pads X-TP, the X-touch routing lines X-TL, the Y-touch pads Y-TP, and the Y-touch routing lines Y-TL can be comprised of the same material, i.e., a first conductive material. The first conductive material can have a single or multilayer structure made of a metal, such as Al, Ti, Cu, or Mo, having high corrosion resistance, high acid resistance, and high conductivity.

For example, each of the X-touch pads X-TP, the X-touch routing lines X-TL, the Y-touch pads Y-TP, and the Y-touch routing lines Y-TL comprised of the first conductive material can have a three-layer structure, such as Ti/Al/Ti or Mo/Al/Mo.

The pad cover electrode capable of covering the X-touch pads X-TP and the Y-touch pads Y-TP can be comprised of the same material as the X and Y-touch electrodes X-TE and Y-TE, i.e., a second conductive material. The second conductive material can be a transparent conductive material, such as indium tin oxide (ITO) or indium zinc oxide (IZO), having high corrosion resistance and acid resistance. The pad cover electrodes can be provided to be exposed from the touch buffer film T-BUF so as to be bonded to the touch driving circuit TDC or to a circuit film on which the touch driving circuit TDC is mounted.

The touch buffer film T-BUF can be provided to cover the touch sensor metal TSM so as to prevent or at least reduce the touch sensor metal TSM from being corroded by external moisture. For example, the touch buffer film T-BUF can be made of an organic insulating material or be provided as a circular polarizer or a film made of an epoxy or acrylic material. The touch buffer film T-BUF may not be provided on the encapsulation layer ENCAP. That is, the touch buffer film T-BUF may not be an essential component.

The Y-touch routing lines Y-TL can be electrically connected to the Y-touch electrodes Y-TE via touch routing line contact holes or be integrated with the Y-touch electrodes Y-TE.

Each of the Y-touch routing lines Y-TL can extend to the non-active area NA, past the top and side portions of the encapsulation layer ENCAP and the dams DAM, so as to be electrically connected to the Y-touch pads Y-TP. Accordingly, the Y-touch routing lines Y-TL can be electrically connected to the touch driving circuit TDC through the Y-touch pads Y-TP.

The Y-touch routing lines Y-TL can deliver the touch-sensing signal from the Y-touch electrodes Y-TE to the touch driving circuit TDC or deliver the touch driving signal, received from the touch driving circuit TDC, to the Y-touch electrodes Y-TE.

The X-touch routing lines X-TL can be electrically connected to the X-touch electrodes X-TE via the touch routing line contact holes or be integrated with the X-touch electrodes X-TE.

The X-touch routing lines X-TL can extend to the non-active area NA, past the top and side portions of the encapsulation layer ENCAP and the dams DAM, so as to be electrically connected to the X-touch pads Y-TP. Accordingly, the X-touch routing lines X-TL can be electrically connected to the touch driving circuit TDC through the X-touch pads X-TP.

The X-touch routing lines X-TL can deliver the touch driving signal, received from the touch driving circuit TDC, to the X-touch electrodes X-TE or deliver touch-sensing signal from the X-touch electrodes X-TE to the touch driving circuit TDC.

The arrangement of the X-touch routing lines X-TL and the Y-touch routing lines Y-TL can be modified variously depending on the design specification of the panel.

A touch protective film PAC can be disposed on the X-touch electrodes X-TE and the Y-touch electrodes Y-TE. The touch protective film PAC can extend to an area in front of or behind the dams DAM so as to be disposed on the X-touch routing lines X-TL and the Y-touch routing lines Y-TL.

The cross-sectional diagram of FIG. 9 is conceptual illustration of the structure. The positions, thicknesses, or widths of the patterns (e.g., various layers or electrodes) can vary depending on the direction or position of view, the structures for connecting the patterns can be modified, additional layers other than the plurality of illustrated layers can be further provided, and some of the plurality of illustrated layers can be omitted or integrated. For example, the width of the banks BANK can be narrower than that illustrated in the drawings, and the height of the dams DAM can be lower or higher than that illustrated in the drawings. In addition, the cross-sectional diagram of FIG. 9 illustrates a structure in which the touch electrode TE, the touch routing lines TL, and the like are disposed on the entirety of the subpixels SP in order to illustrate a structure connected to the touch pads TP along inclines of the touch routing lines TL and the encapsulation layer ENCAP. However, in a case in which the touch electrode TE or the like is mesh-shaped as described above, the open areas OA of the touch electrode TE can be located above the emitting areas of the subpixels SP. In addition, a color filter CF (see FIGS. 10 and 11) can be further disposed on the encapsulation layer ENCAP. The color filter CF can be located on the touch electrode TE or between the encapsulation layer ENCAP and the touch electrode TE.

Figure 10:
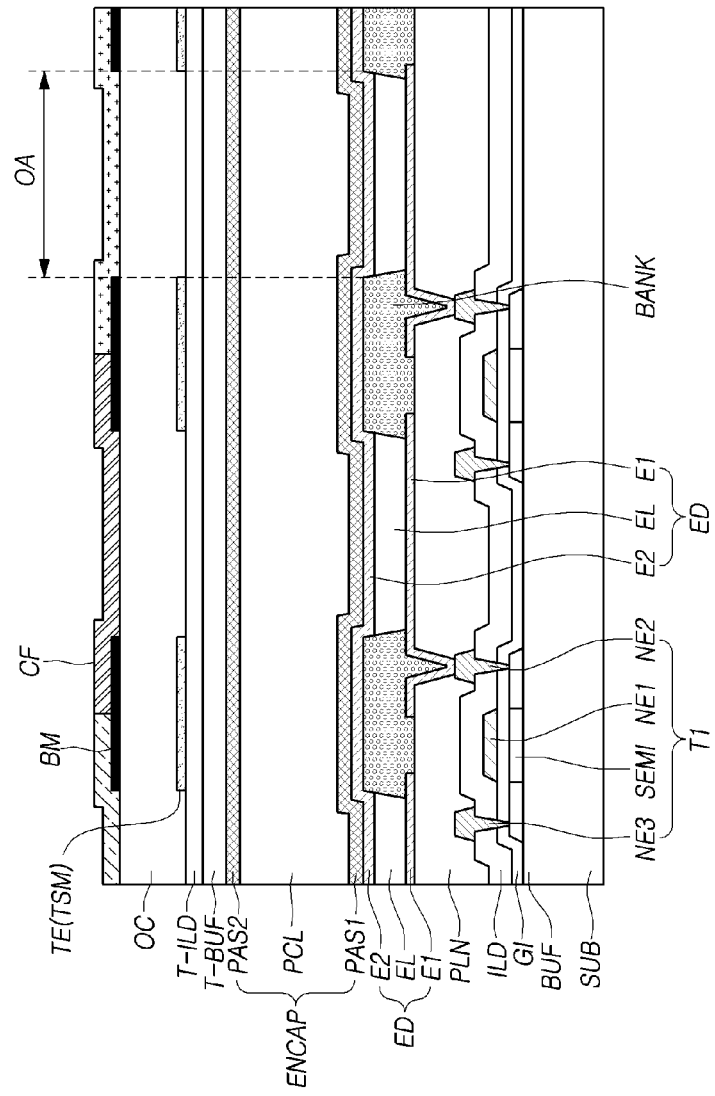
FIGS. 10 and 11 are diagrams illustrating a cross-sectional structure of a display panel including a color filter according to embodiments of the present disclosure.
Figure 11:
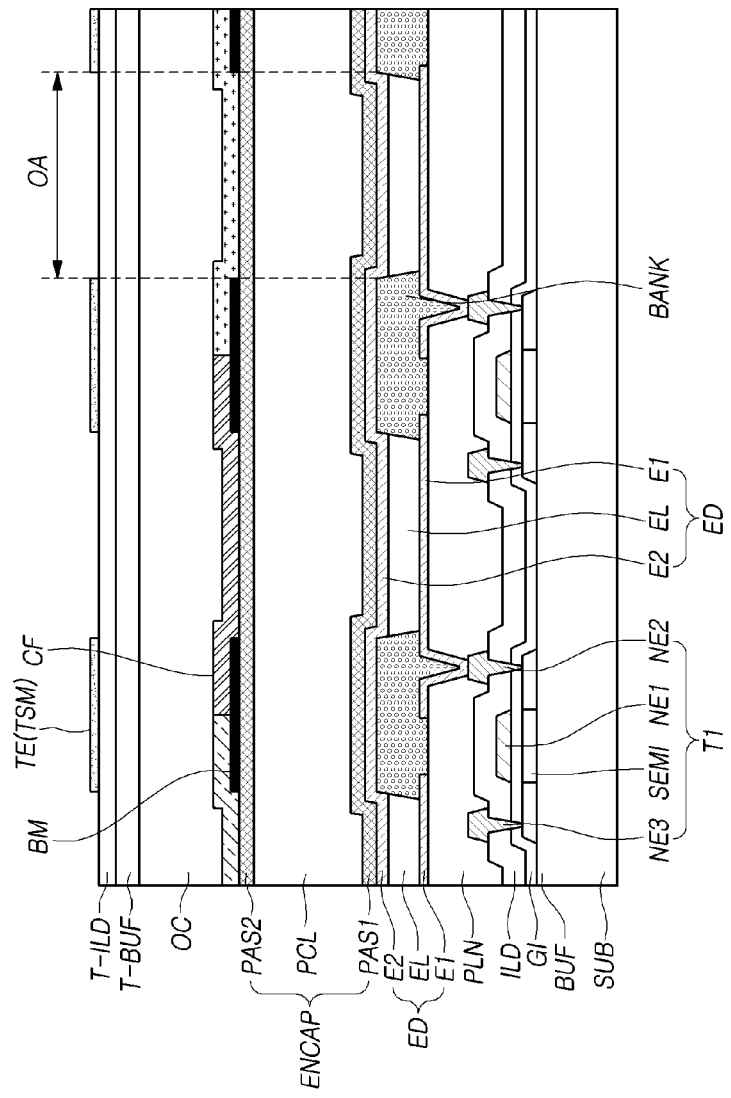

FIGS. 10 and 11 are diagrams illustrating a cross-sectional structure of the display panel DISP including the color filter CF according to embodiments of the present disclosure.

Referring to FIGS. 10 and 11, in a case in which the touch panel TSP is disposed within the display panel DISP and the display panel DISP is provided as an OLED display panel, the touch panel TSP can be located on the encapsulation layer ENCAP in the display panel DISP. That is, the touch sensor metals TSM, such as the plurality of touch electrodes TE and the plurality of touch routing lines TL, can be located on the encapsulation layer ENCAP in the display panel DISP.

The touch electrode TE being provided on the encapsulation layer ENCAP as described above can be made as the touch electrode TE without significantly influencing the display performance or the formation of a display-related layer.

Referring to FIGS. 10 and 11, the second electrode E2 that can be the cathode of the OLED can be located below the encapsulation layer ENCAP.

The thickness T of the encapsulation layer ENCAP can be, for example, 1 μm or more.

Since the thickness of the encapsulation layer ENCAP is designed to be 1 μm or more as described above, parasitic capacitance generated between the second electrode E2 and the touch electrodes TE of the OLED can be reduced, thereby preventing touch sensitivity from being reduced by the parasitic capacitance.

As described above, each of the plurality of touch electrodes TE is patterned in the shape of a mesh, in which the electrode metal EM has two or more open areas OA. Each of the two or more open areas OA can correspond to one or more subpixels or the emitting areas thereof when viewed in a vertical direction.

As described above, the electrode metal EM of the touch electrode TE can be patterned such that the emitting area of one or more subpixels SP is provided in a position corresponding to each of the two or more open areas OA present in the area of the touch electrode TE when viewed in a plan view. Accordingly, the luminous efficiency of the display panel DISP can be improved.

As illustrated in FIGS. 10 and 11, a black matrix BM can be provided in the display panel DISP. The color filter CF can be further provided in the display panel DISP.

The position of the black matrix BM can correspond to the position of the electrode metal EM of the touch electrode TE.

The positions of the plurality of color filters CF correspond to the positions of the plurality of touch electrodes TE or the position of the electrode metal EM constituting the plurality of touch electrodes TE.

Since the plurality of color filters CF are located in positions corresponding to the plurality of open areas OA as described above, the luminous performance of the display panel DISP can be improved.

The vertical positional relationship between the plurality of color filters CF and the plurality of touch electrodes TE will be described as follows.

As illustrated in FIG. 10, the plurality of color filters CF and the black matrix BM can be located on the plurality of touch electrodes TE.

In this case, the plurality of color filters CF and the black matrix BM can be located on the overcoat layer OC disposed on the plurality of touch electrodes TE. Here, the overcoat layer OC can be the same layer as or a different layer from the touch protective film PAC illustrated in FIG. 9.

Alternatively, as illustrated in FIG. 11, the plurality of color filters CF and the black matrix BM can be located below the plurality of touch electrodes TE.

In this case, the plurality of touch electrodes TE can be located on the overcoat layer OC on the plurality of color filters CF and the black matrix BM. The overcoat layer OC can be the same layer as or a different layer from the touch buffer film T-BUF or the touch insulating film T-ILD illustrated in FIG. 9. Alternatively, the touch buffer film T-BUF or the touch insulating film T-ILD can be disposed in a manner separate from the overcoat layer OC.

Due to the vertical positional relationship between the touch electrode TE and a display driving configuration being adjusted as described above, a touch sensing configuration can be disposed without degrading the display performance.

Furthermore, embodiments of the present disclosure can provide a touch display device including a touch sensor structure being capable of reducing a load by the touch electrode TE and a touch routing line TL. Even if a size of the display panel DISP increases, or a length of the touch routing line TL connected between the touch electrode TE and the touch driving circuit TDC increases, a performance of a touch sensing by the touch display device can be improved by reducing the load.

Figure 12:
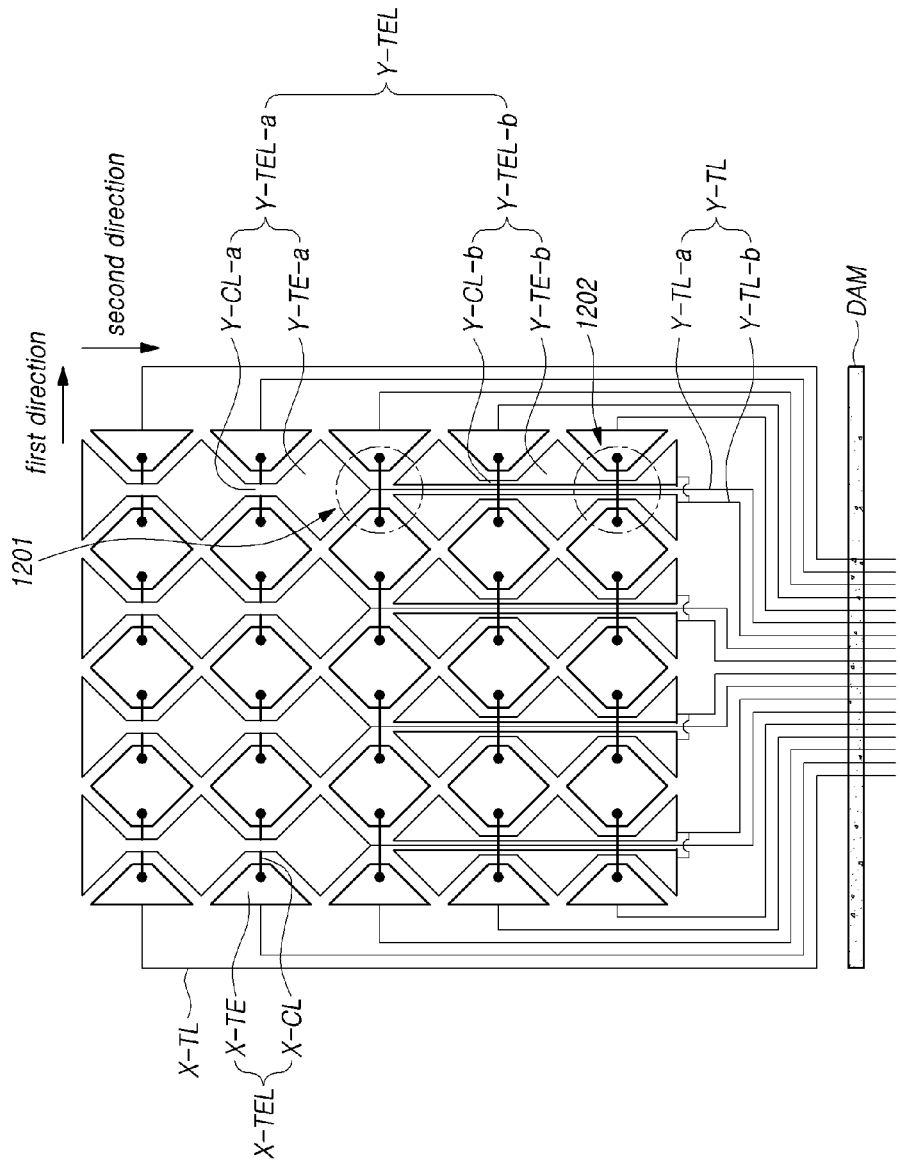
FIG. 12 is a diagram briefly illustrating an example of a touch sensor structure disposed on a display panel according to embodiments of the present disclosure.
Figure 13:
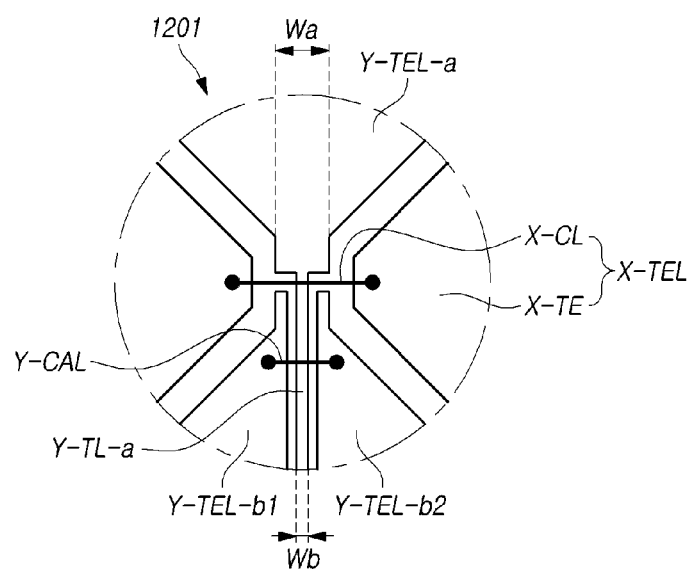
FIG. 13 is an enlarged view of a portion indicated by 1201 illustrated in FIG. 12 according to embodiments of the present disclosure.
Figure 14:
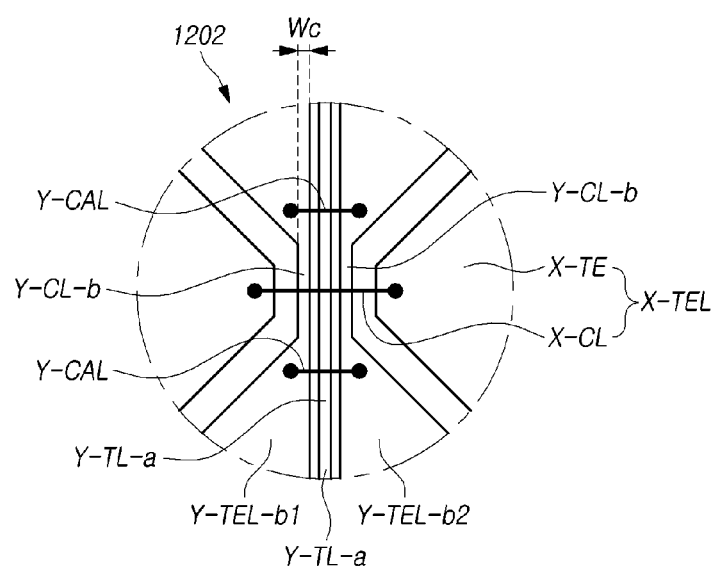
FIG. 14 is an enlarged view of a portion indicated by 1202 illustrated in FIG. 12 according to embodiments of the present disclosure.

FIG. 12 is a diagram briefly illustrating an example of a touch sensor structure disposed on the display panel DISP according to embodiments of the present disclosure. FIG. 13 is an enlarged view of a portion indicated by 1201 illustrated in FIG. 12 according to embodiments of the present disclosure. FIG. 14 is an enlarged view of a portion indicated by 1202 illustrated in FIG. 12 according to embodiments of the present disclosure.

Referring to FIG. 12, a plurality of touch electrode lines TEL can be disposed on the active area AA of the display panel DISP. A plurality of touch routing lines TL can be disposed on the non-active area NA positioned outside of the active area AA of the display panel DISP.

At least one of the plurality of touch electrode lines TEL can include two or more touch electrode line parts separated from each other on the active area AA.

For example, each of the plurality of Y-touch electrode lines can include a first Y-touch electrode line part Y-TEL-a and a second Y-touch electrode line part Y-TEL-b.

The first Y-touch electrode line part Y-TEL-a can include at least one first Y-touch electrode Y-TE-a and at least one first Y-touch electrode connecting line Y-CL-a.

The second Y-touch electrode line part Y-TEL-b can include at least one second Y-touch electrode Y-TE-b and at least one second Y-touch electrode connecting line Y-CL-b.

The first Y-touch electrode line part Y-TEL-a and the second Y-touch electrode line part Y-TEL-b can be disposed to be separated from each other on the active area AA.

FIG. 12 illustrates an example that the Y-touch electrode line Y-TEL is divided as two Y-touch electrode line parts, but the Y-touch electrode line Y-TEL can be divided as three or more Y-touch electrode line parts.

Furthermore, the X-touch electrode line X-TEL can be disposed to be divided as a plurality of X-touch electrode line parts. Each of the X-touch electrode line X-TEL and the Y-touch electrode line Y-TEL can be disposed to be divided as a plurality of touch electrode line parts.

The first Y-touch electrode line part Y-TEL-a can be electrically connected to a first Y-touch routing line Y-TL-a. The second touch electrode line part Y-TEL-b can be electrically connected to a second Y-touch routing line Y-TL-b.

As the first Y-touch electrode line part Y-TEL-a and the second Y-touch electrode line part Y-TEL-b are separated from each other and are connected to different Y-touch routing lines Y-TL, thus a load by the Y-touch electrode line Y-TEL and the Y-touch routing line Y-TL can be reduced.

A portion of the first Y-touch routing line Y-TL-a can be disposed on the active area AA. The first Y-touch routing line Y-TL-a can be electrically connected to the first Y-touch electrode line part Y-TEL-a on the active area AA.

The second Y-touch routing line Y-TL-b can be disposed on the non-active area NA and electrically connected to the second Y-touch electrode line part Y-TEL-b.

As the portion of the first Y-touch routing line Y-TL-a connected to the first Y-touch electrode line part Y-TEL-a positioned farther from the touch driving circuit TDC is disposed on the active area AA, a load by the first Y-touch routing line Y-TL-a can be reduced and it can be prevented that the non-active area NA increases due to an arrangement of the first Y-touch routing line Y-TL-a.

At least a portion of the first Y-touch routing line Y-TL-a can be disposed on a layer where the first Y-touch electrode line part Y-TEL-a and the second Y-touch electrode line part Y-TEL-b are disposed. The first Y-touch routing line Y-TL-a can be connected to the first Y-touch electrode line part Y-TEL-a on the active area, and can be disposed inside of the second Y-touch electrode line part Y-TEL-b.

Referring to FIG. 13 and FIG. 14, the second Y-touch electrode line part Y-TEL-b can be disposed to be separated as a first part Y-TEL-b1 and a second part Y-TEL-b2.

The first Y-touch routing line Y-TL-a can be disposed between the first part Y-TEL-b1 and the second part Y-TEL-b2 of the second Y-touch electrode line part Y-TEL-b.

The first Y-touch routing line Y-TL-a can pass between the first part Y-TEL-b1 and the second part Y-TEL-b2 of the second Y-touch electrode line part Y-TEL-b, and can be connected to the first Y-touch electrode line part Y-TEL-a.

As the first Y-touch routing line Y-TL-a is disposed between the first part Y-TEL-b1 and the second part Y-TEL-b2 of the second Y-touch electrode line part Y-TEL-b, a width Wb of the first Y-touch routing line Y-TL-a can be smaller than a width Wa of a portion that the first Y-touch routing line Y-TL-a is connected to the first Y-touch electrode line part Y-TEL-a.

As the first Y-touch routing line Y-TL-a is disposed between the first part Y-TEL-b1 and the second part Y-TEL-b2 of the second Y-touch electrode line part Y-TEL-b, a width Wc of the second Y-touch electrode connecting line Y-CL-b included in the second Y-touch electrode line part Y-TEL-b can be less than a width Wa of a portion that the first Y-touch routing line Y-TL-a is connected to the first Y-touch electrode line part Y-TEL-a.

At least one Y-touch electrode connecting auxiliary line Y-CAL can be disposed to cross the first Y-touch routing line Y-TL-a.

The Y-touch electrode connecting auxiliary line Y-CAL can be disposed on a layer different from a layer where the first Y-touch routing line Y-TL-a is disposed. The Y-touch electrode connecting auxiliary line Y-CAL can be disposed on a layer where the X-touch electrode connecting line X-CL is disposed.

The Y-touch electrode connecting auxiliary line Y-CAL can electrically connect between the first part Y-TEL-b1 and the second part Y-TEL-b2 of the second Y-touch electrode line part Y-TEL-b on at least one point.

For example, the Y-touch electrode connecting auxiliary line Y-CAL can connect between the first part Y-TEL-b1 and the second part Y-TEL-b2 of the second Y-touch electrode line part Y-TEL-b on a portion except the second Y-touch electrode connecting line Y-CL-b included in the second Y-touch electrode line part Y-TEL-b.

As connecting between the first part Y-TEL-b1 and the second part Y-TEL-b2 of the second Y-touch electrode line part Y-TEL-b by the Y-touch electrode connecting auxiliary line Y-CAL, it can be prevent that a load increase even the second Y-touch electrode line part Y-TEL-b is disposed as a divided structure on the active area AA due to an arrangement of the first Y-touch routing line Y-TL-a.

Furthermore, embodiments of the present disclosure, as making the first Y-touch routing line Y-TL-a and the second Y-touch routing line Y-TL-b to be electrically connected to each other on an area except the active area AA, can prevent that a channel of the touch driving circuit TDC increases due to an increase of the touch routing line TL while maintaining a load reduction.

Figure 15:
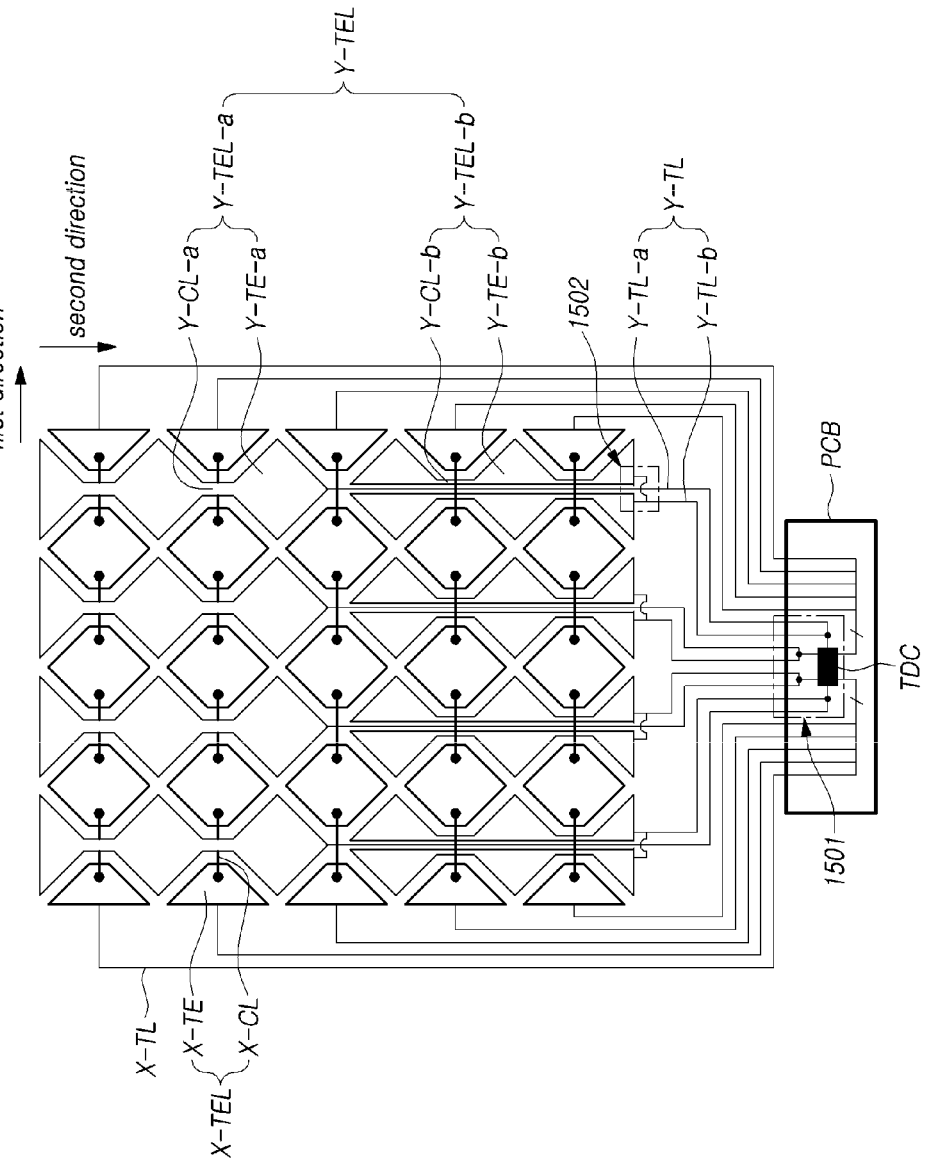
FIG. 15 is a diagram briefly illustrating another example of a touch sensor structure disposed on a display panel according to embodiments of the present disclosure.
Figure 16:
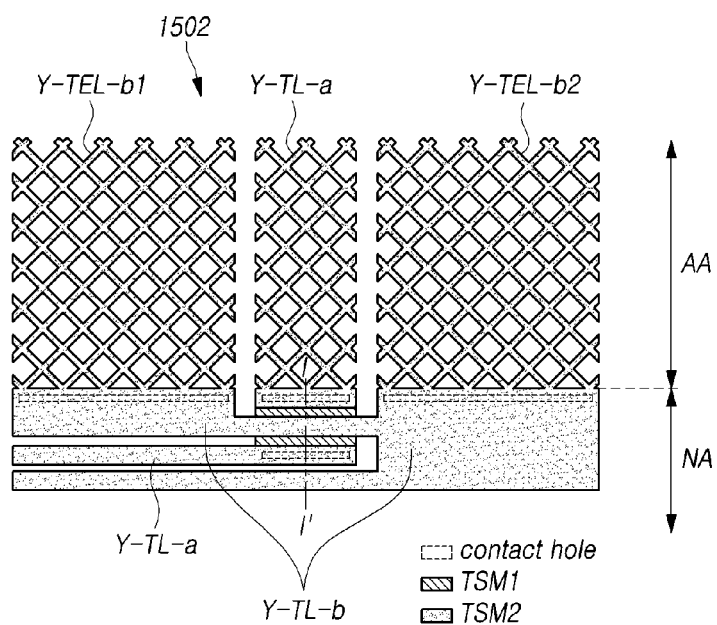
FIG. 16 is an enlarged view of a portion indicated by 1502 illustrated in FIG. 15 according to embodiments of the present disclosure.
Figure 17:
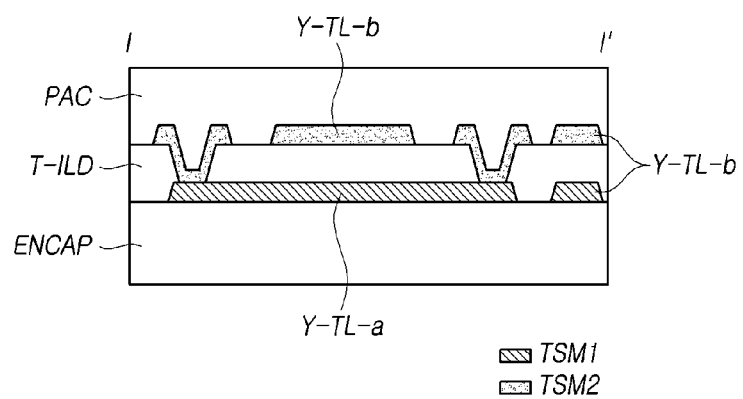
FIG. 17 is a cross-sectional view of a portion I-I' illustrated in FIG. 16 according to embodiments of the present disclosure.

FIG. 15 is a diagram briefly illustrating another example of a touch sensor structure disposed on the display panel DISP according to embodiments of the present disclosure. FIG. 16 is an enlarged view of a portion indicated by 1502 illustrated in FIG. 15 according to embodiments of the present disclosure. FIG. 17 is a cross-sectional view of a portion I-I' illustrated in FIG. 16 according to embodiments of the present disclosure.

Referring to FIG. 15, for example, the Y-touch electrode line Y-TEL of the touch electrode line TEL can be disposed on the active area AA to be divided as two Y-touch electrode line parts.

The first Y-touch electrode line part Y-TEL-a can be electrically connected to the first Y-touch routing line Y-TL-a on the active area AA.

The first Y-touch routing line Y-TL-a can be disposed on the active area AA and the non-active area NA, and can electrically connect between the first Y-touch electrode line part Y-TEL-a and the touch driving circuit TDC.

The second Y-touch electrode line part Y-TEL-b can be electrically connected to the second Y-touch routing line Y-TL-b on a boundary of the active area AA or outside of the active area AA.

The second Y-touch routing line Y-TL-b can be disposed on the non-active area NA, and can electrically connect between the second Y-touch electrode line part Y-TEL-b and the touch driving circuit TDC.

The first Y-touch routing line Y-TL-a and the second Y-touch routing line Y-TL-b can be disposed to be separated from each other on the active area AA.

The first Y-touch routing line Y-TL-a and the second Y-touch routing line Y-TL-b can be electrically connected to each other on an area except the active area AA.

The first Y-touch routing line Y-TL-a and the second Y-touch routing line Y-TL-b can be electrically connected to each other on at least one point between a boundary of the active area AA and the touch driving circuit TDC.

For example, the first Y-touch routing line Y-TL-a and the second Y-touch routing line Y-TL-b, such as a portion indicated by 1501 in FIG. 15, can be electrically connected to each other on a printed circuit board PCB where the touch driving circuit TDC is disposed.

As the first Y-touch routing line Y-TL-a and the second Y-touch routing line Y-TL-b are electrically connected to each other outside of the active area AA, a distance between a connecting point of the first Y-touch routing line Y-TL-a and the second Y-touch routing line Y-TL-b and the touch driving circuit TDC can be small.

A resistance between the connecting point of the first Y-touch routing line Y-TL-a and the second Y-touch routing line Y-TL-b and the touch driving circuit TDC can be negligible and small comparing to a resistance by the touch electrode line TEL and the touch routing line TL disposed on the active area AA.

As the first Y-touch routing line Y-TL-a and the second Y-touch routing line Y-TL-b are connected to each other on the printed circuit board PCB, thus a channel for driving the first Y-touch routing line Y-TL-a and the second Y-touch routing line Y-TL-b may not increase. And such as described above, a load reduction can be maintained.

The first Y-touch routing line Y-TL-a and the second Y-touch routing line Y-TL-b can be connected to each other on the printed circuit board PCB, and may not be connected to each other on an area except the printed circuit board PCB.

As the first Y-touch routing line Y-TL-a is disposed inside of the second Y-touch electrode line part Y-TEL-b and the second Y-touch routing line Y-TL-b is connected to the second Y-touch electrode line part Y-TEL-b, such as a portion indicated by 1502 illustrated in FIG. 15, an area where the second Y-touch routing line Y-TL-b and the first Y-touch routing line Y-TL-a cross can exist.

The first Y-touch routing line Y-TL-a and the second Y-touch routing line Y-TL-b can be disposed as an insulated structure on a point crossing each other.

Referring to FIG. 16 and FIG. 17, the first Y-touch routing line Y-TL-a and the second Y-touch electrode line part Y-TEL-b disposed on the active area AA can have a mesh shape. The first Y-touch routing line Y-TL-a and the second Y-touch electrode line part Y-TEL-b can be disposed to be separated from each other on the active area AA.

For example, an electrode metal of a mesh shape is cut, and is divided as the first Y-touch routing line Y-TL-a and the second Y-touch electrode line part Y-TEL-b.

The second Y-touch electrode line part Y-TEL-b can be connected to the second Y-touch routing line Y-TL-b on the non-active area NA adjacent to a boundary of the active area AA.

The second Y-touch routing line Y-TL-b can be made of a second touch sensor metal TSM2 disposed on a same layer with the second Y-touch electrode line part Y-TEL-b. The second Y-touch routing line Y-TL-b can further include a first touch sensor metal TSM1 positioned on a lower layer of the second touch sensor metal TSM2.

The first touch sensor metal TSM1 can be disposed to overlap at least a portion of the second touch sensor metal TSM2 and can be electrically connected to the second touch sensor metal TSM2 on at least one point. The second Y-touch routing line Y-TL-b can be formed as a double line structure and a resistance of the second Y-touch routing line Y-TL-b can be reduced.

The first Y-touch routing line Y-TL-a can cross the second Y-touch routing line Y-TL-b on the non-active area NA adjacent to a boundary of the active area AA. The first Y-touch routing line Y-TL-a can be made of the first touch sensor metal TSM1 on an area crossing the second Y-touch routing line Y-TL-b.

A portion of the first Y-touch routing line Y-TL-a made of the second touch sensor metal TSM2 and a portion of the first Y-touch routing line Y-TL-a made of the first touch sensor metal TSM1 can be electrically connected to each other through a contact hole.

The first Y-touch routing line Y-TL-a can be disposed as a structure insulated from the second Y-touch routing line Y-TL-b on an area crossing the second Y-touch routing line Y-TL-b and can extend to the touch driving circuit TDC.

The first Y-touch routing line Y-TL-a also can include the first touch sensor metal TSM1 and the second touch sensor metal TSM2 overlapping each other on the non-active area NA similarly with the second Y-touch routing line Y-TL-b. The first touch sensor metal TSM1 and the second touch sensor metal TSM2 can be electrically connected to each other on at least one point and can form a double line structure, a resistance of the first Y-touch routing line Y-TL-a can be reduced.

The first Y-touch routing line Y-TL-a and the second Y-touch routing line Y-TL-b can maintain a structure separated electrically until reaching the printed circuit board PCB that the touch driving circuit TDC is mounted. The first Y-touch routing line Y-TL-a and the second Y-touch routing line Y-TL-b can be insulated on the encapsulation layer ENCAP, and can be insulated between the active area AA and a dam.

The first Y-touch routing line Y-TL-a and the second Y-touch routing line Y-TL-b can be electrically connected to each other on the printed circuit board PCB and can be electrically connected to the touch driving circuit TDC. A load can be reduced by a divided structure of the touch electrode line TEL and the touch routing line TL without an increase of a channel.

The first Y-touch routing line Y-TL-a and the second Y-touch routing line Y-TL-b, in some cases, can be electrically connected to each other on an area other than the printed circuit board PCB.

Figure 18:
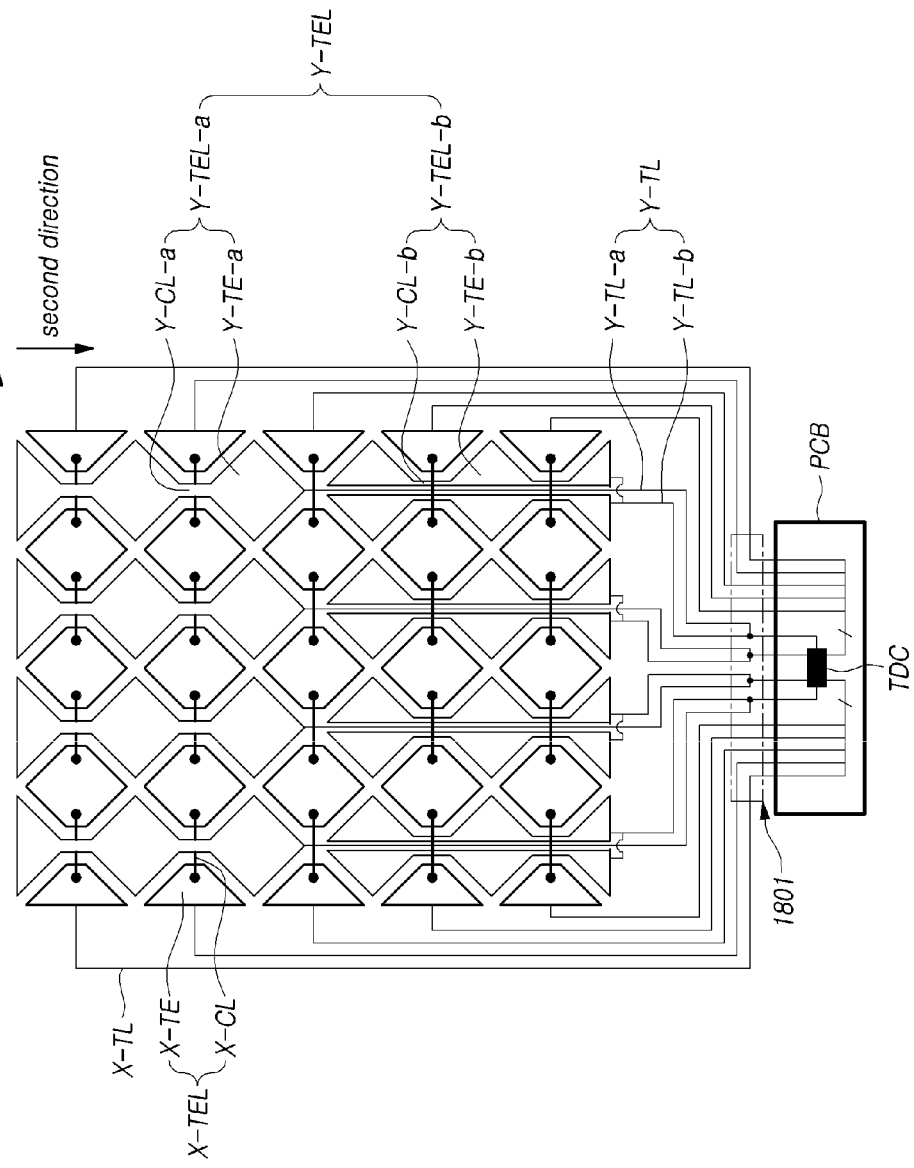
FIG. 18 is a diagram briefly illustrating still another example of a touch sensor structure disposed on a display panel according to embodiments of the present disclosure.
Figure 19:
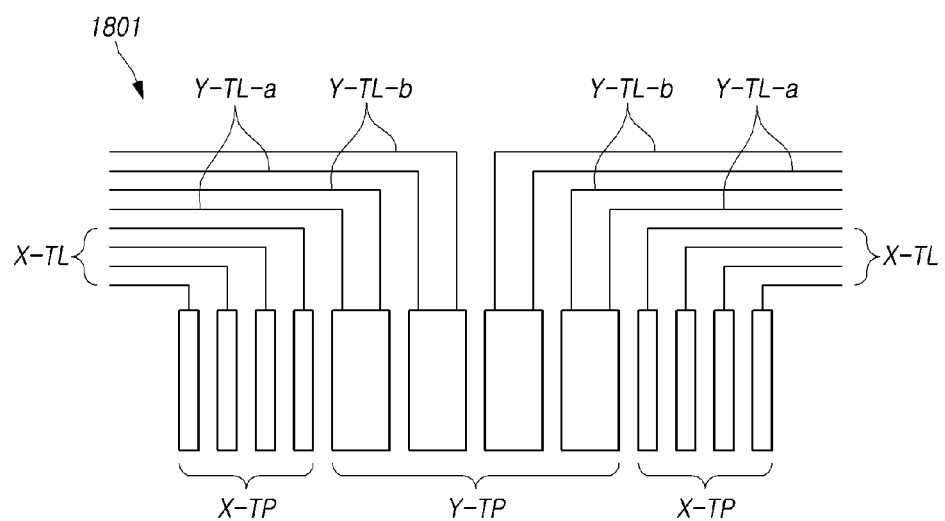
FIG. 19 is an enlarged view of a portion indicated by 1801 illustrated in FIG. 18 according to embodiments of the present disclosure.

FIG. 18 is a diagram briefly illustrating still another example of a touch sensor structure disposed on the display panel DISP according to embodiments of the present disclosure. FIG. 19 is an enlarged view of a portion indicated by 1801 illustrated in FIG. 18 according to embodiments of the present disclosure.

Referring to FIG. 18, the Y-touch electrode line Y-TEL can be disposed as the first Y-touch electrode line part Y-TEL-a and the second Y-touch electrode line part Y-TEL-b separated from each other.

The first Y-touch electrode line part Y-TEL-a can be connected to the first Y-touch routing line Y-TL-a partially disposed on the active area AA. The second Y-touch electrode line part Y-TEL-b can be connected to the second Y-touch routing line Y-TL-b disposed on the non-active area NA.

The first Y-touch routing line Y-TL-a and the second Y-touch routing line Y-TL-b can be disposed as a structure insulated from each other on an area adjacent to a boundary of the active area AA.

The first Y-touch routing line Y-TL-a and the second Y-touch routing line Y-TL-b can be electrically connected to each other by a pad disposed on the non-active area NA. The first Y-touch routing line Y-TL-a and the second Y-touch routing line Y-TL-b can be insulated on the encapsulation layer ENCAP, and can be insulated between the active area AA and the dam.

The first Y-touch routing line Y-TL-a and the second Y-touch routing line Y-TL-b can be electrically connected to each other on a pad area which is not positioned far from the touch driving circuit TDC and can be electrically connected to the touch driving circuit TDC.

As a length of the touch routing line TL connected between the touch driving circuit TDC and a pad is very small comparing to a length of the touch routing line TL connected between the pad area and the touch electrode line TEL, an entire load can be reduced by a divided structure of the first Y-touch routing line Y-TL-a and the second Y-touch routing line Y-TL-b. As the first Y-touch routing line Y-TL-a and the second Y-touch routing line Y-TL-b are driven by a same channel, an entire load can be reduced without an increase of a channel in the touch driving circuit TDC.

As a pad connected to the first Y-touch routing line Y-TL-a and the second Y-touch routing line Y-TL-b is connected to two touch routing line TL, can have a different size from other pads.

Referring to FIG. 19, it illustrates an example of a pad structure disposed on a pad area of the display panel DISP.

Each of the X-touch routing line X-TL connected to the X-touch electrode line X-TEL can be connected to one X-touch pad X-TP.

The first Y-touch routing line Y-TL-a connected to the first Y-touch electrode line part Y-TEL-a and the second Y-touch routing line Y-TL-b connected to the second Y-touch electrode line part Y-TEL-b can be connected to one Y-touch pad Y-TP.

An area of the Y-touch pad Y-TP can be greater than an area of the X-touch pad X-TP.

As implementing a size of the Y-touch pad Y-TP and a size of the X-touch pad X-TP to be different, a structure that the first Y-touch routing line Y-TL-a and the second Y-touch routing line Y-TL-b driving the Y-touch electrode line parts separated from each other are connected can be implemented easily.

Such as described above, as connecting the first Y-touch routing line Y-TL-a and the second Y-touch routing line Y-TL-b electrically each other by using the pad area, a structure being capable of reducing a load of the touch routing line TL can be implemented without an increase of a channel of the touch driving circuit TDC.

Alternatively, the first Y-touch routing line Y-TL-a and the second Y-touch routing line Y-TL-b can be electrically connected to each other between the active area AA and the pad area.

Figure 20:
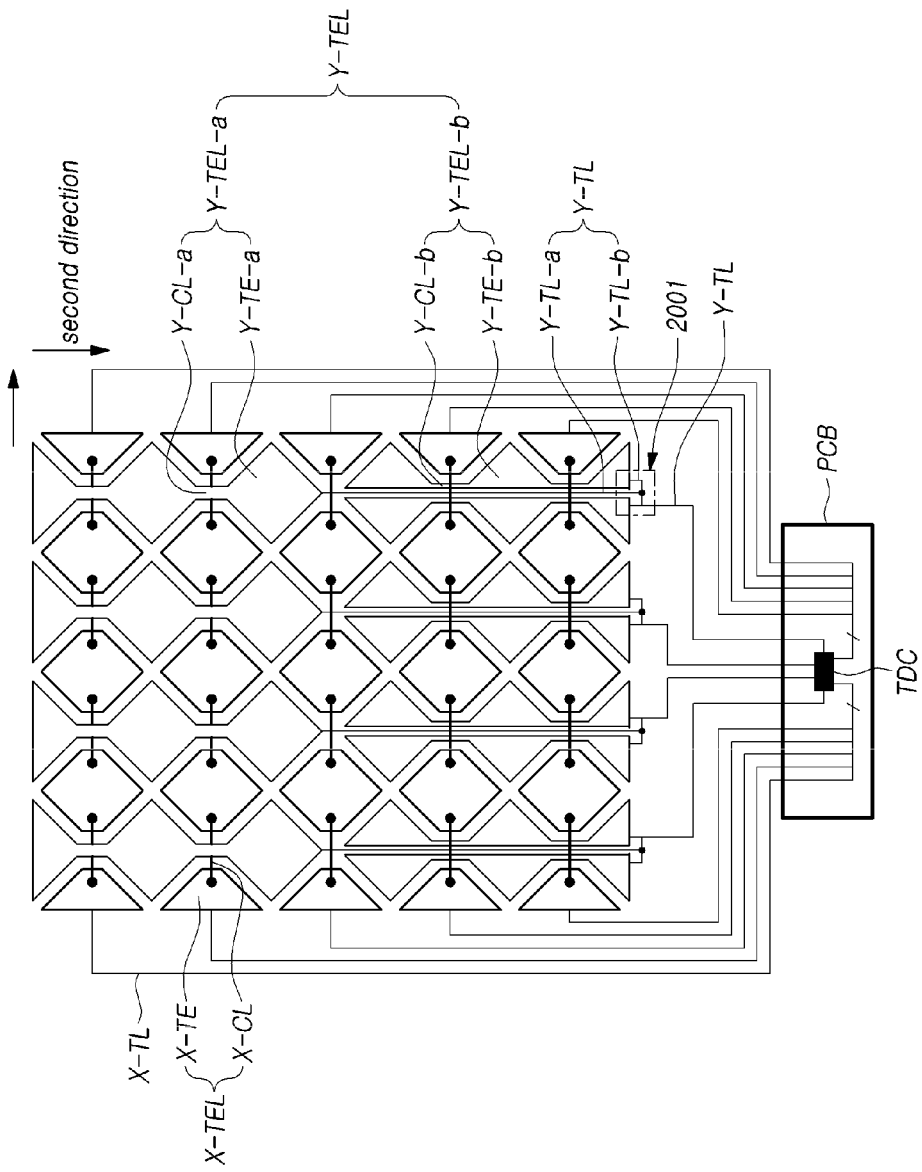
FIG. 20 is a diagram briefly illustrating still another example of a touch sensor structure disposed on a display panel according to embodiments of the present disclosure.
Figure 21:
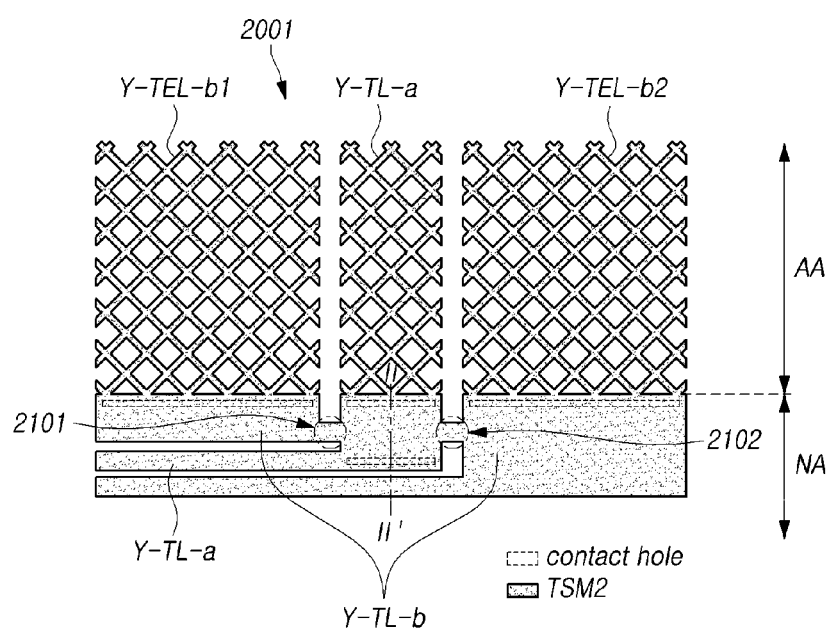
FIG. 21 is an enlarged view of an example of a portion indicated by 2001 illustrated in FIG. 20 according to embodiments of the present disclosure.
Figure 22:
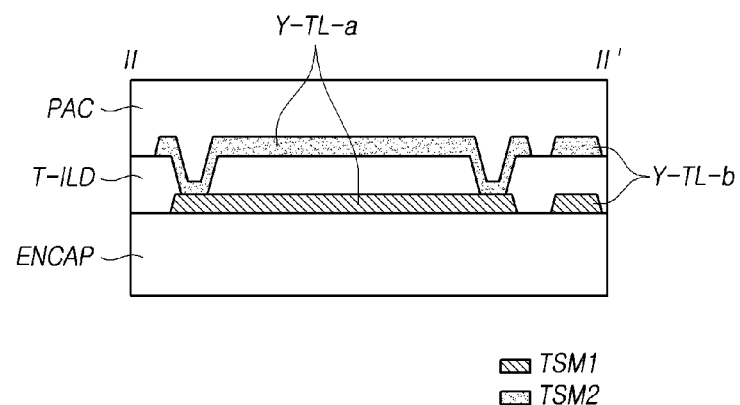
FIG. 22 is a cross-sectional view of a portion II-II' illustrated in FIG. 21 according to embodiments of the present disclosure.
Figure 23:
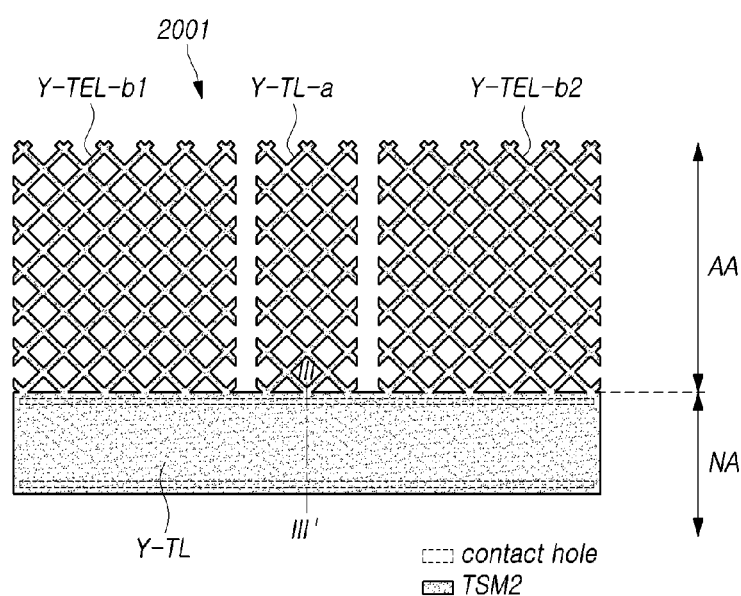
FIG. 23 is an enlarged view of another example of a portion indicated by 2001 illustrated in FIG. 20 according to embodiments of the present disclosure.
Figure 24:
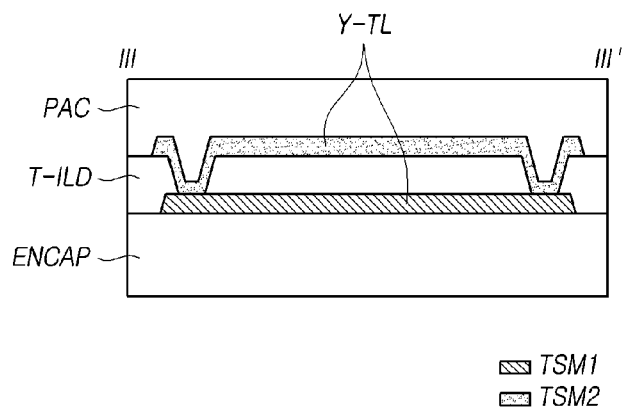
FIG. 24 is a cross-sectional view of a portion III-III' illustrated in FIG. 23 according to embodiments of the present disclosure.

FIG. 20 is a diagram briefly illustrating still another example of a touch sensor structure disposed on the display panel DISP according to embodiments of the present disclosure. FIG. 21 is an enlarged view of an example of a portion indicated by 2001 illustrated in FIG. 20 according to embodiments of the present disclosure. FIG. 22 is a cross-sectional view of a portion II-II' illustrated in FIG. 21 according to embodiments of the present disclosure. FIG. 23 is an enlarged view of another example of a portion indicated by 2001 illustrated in FIG. 20 according to embodiments of the present disclosure. FIG. 24 is a cross-sectional view of a portion III-III' illustrated in FIG. 23 according to embodiments of the present disclosure.

Referring to FIG. 20, the first Y-touch electrode line part Y-TEL-a can be connected to the first Y-touch routing line Y-TL-a on the active area AA.

The second Y-touch electrode line part Y-TEL-b can be connected to the second Y-touch routing line Y-TL-b on a boundary of the active area AA or on the non-active area NA adjacent to the active area AA.

The first Y-touch routing line Y-TL-a and the second Y-touch routing line Y-TL-b can be electrically connected to each other on an area adjacent to a boundary of the active area AA.

The first Y-touch routing line Y-TL-a and the second Y-touch routing line Y-TL-b can cross each other outside of the active area AA. The first Y-touch routing line Y-TL-a and the second Y-touch routing line Y-TL-b are electrically connected to each other on an area crossing each other. A connecting structure of the first Y-touch routing line Y-TL-a and the second Y-touch routing line Y-TL-b can be implemented easily.

Referring to FIG. 21 and FIG. 22, the first Y-touch routing line Y-TL-a disposed on the active area AA can be extended to the non-active area NA. The second Y-touch electrode line part Y-TEL-b can be connected to the second Y-touch routing line Y-TL-b on a boundary of the active area AA or outside of the boundary of the active area AA.

The first Y-touch routing line Y-TL-a and the second Y-touch routing line Y-TL-b can be connected to each other such as a portion indicated by 2101 and 2102. The first Y-touch routing line Y-TL-a can be directly connected to the second Y-touch routing line Y-TL-b on an area crossing the second Y-touch routing line Y-TL-b.

The first Y-touch routing line Y-TL-a and the second Y-touch routing line Y-TL-b are connected to each other outside of the active area AA, and can form a double line structure by the first touch sensor metal TSM1 and the second touch sensor metal TSM2.

A connecting structure of the first Y-touch routing line Y-TL-a and the second Y-touch routing line Y-TL-b can be implemented easily, and a resistance of the first Y-touch routing line Y-TL-a and the second Y-touch routing line Y-TL-b outside of the active area AA can reduced.

Furthermore, an example illustrated in FIG. 21 represents a structure that the first Y-touch routing line Y-TL-a and the second Y-touch routing line Y-TL-b are separated from each other on a part area of the non-active area NA, but the first Y-touch routing line Y-TL-a and the second Y-touch routing line Y-TL-b can be completely integral on the non-active area NA.

For example, such as an example illustrated in FIG. 23, the first Y-touch routing line Y-TL-a and the second Y-touch electrode line part Y-TEL-b can be disposed to be divided on the active area AA.

The first Y-touch routing line Y-TL-a and the second Y-touch electrode line part Y-TEL-b can be connected to the Y-touch routing line Y-TL on a boundary of the active area AA or outside of the active area AA.

The Y-touch routing line Y-TL can be disposed as a shape of a single line on the non-active area NA. It can be seen that the first Y-touch routing line Y-TL-a and the second Y-touch routing line Y-TL-b are integral from outside of the active area AA to the touch driving circuit TDC.

The Y-touch routing line Y-TL, such as an example illustrated in FIG. 24, can include the first touch sensor metal TSM1 and the second touch sensor metal TSM2. The first touch sensor metal TSM1 and the second touch sensor metal TSM2 overlap and constitute the Y-touch routing line Y-TL.

The first touch sensor metal TSM1 and the second touch sensor metal TSM2 constituting the Y-touch routing line Y-TL can be electrically connected to each other through a contact hole on a plurality of points between the active area AA and the touch pad TP. A portions, size, shape, number of the contact hole that the first touch sensor metal TSM1 and the second touch sensor metal TSM2 are connected can be various.

As the Y-touch routing line Y-TL is constituted by the first touch sensor metal TSM1 and the second touch sensor metal TSM2, thus a resistance of the Y-touch routing line Y-TL can be reduced.

In a case that the Y-touch routing line Y-TL is disposed as a shape of a single line on the non-active area NA, by a method for cutting an electrode metal of a mesh shape disposed on the active area AA as the first Y-touch routing line Y-TL-a and the second Y-touch electrode line part Y-TEL-b, a structure being capable of reducing a load by the touch electrode line TEL and the touch routing line TL can be implemented without an increase of a channel.

A load of the touch routing line TL disposed between outside of the active area AA and the touch driving circuit TDC can be much smaller than a load of the touch electrode line TEL and the touch routing line TL disposed on the active area AA.

A connecting structure of the first Y-touch routing line Y-TL-a and the second Y-touch routing line Y-TL-b can be implemented easily without an increase of a channel, and an entire load of the touch routing line Y-TL can be reduced.

An example described above is an example that the Y-touch electrode line Y-TEL is divided, but embodiments of the present disclosure can apply to a case that the X-touch electrode line X-TEL is divided.

The embodiments of the present disclosure described above will be briefly described as follows.

A touch display device according to embodiments of the present disclosure can include a plurality of touch electrode lines TEL disposed on the active area AA of the display panel DISP. At least one of the plurality of touch electrode lines TEL include two or more touch electrode line parts separated from each other on the active area AA.

One of the two or more touch electrode line parts can be connected to a first touch routing line partially disposed on the active area AA. Other one of the two or more touch electrode line parts can be connected to a second touch routing line disposed on the non-active area NA.

The first touch routing line and the second touch routing line can be electrically connected to each other on an area except the active area AA.

The first touch routing line and the second touch routing line can be electrically connected to each other on a printed circuit on which a touch driving circuit TDC configured to drive the plurality of touch routing lines TL is disposed.

The first touch routing line and the second touch routing line can be electrically connected to each other by at least one pad of a plurality of pads disposed on the non-active area NA.

Among the plurality of pads, an area of a pad electrically connected to the first touch routing line and the second touch routing line can be greater than an area of at least one pad of the plurality of pads.

The first touch routing line and the second touch routing line can cross each other on at least one point of the non-active area NA. The first touch routing line is not connected to the second touch routing line on the point where the first touch routing line crosses the second touch routing line.

The touch display device can include at least one dam disposed on the non-active area NA and surrounding the active area AA. The first touch routing line and the second touch routing line can be electrically connected to each other outside of the at least one dam.

The first touch routing line and the second touch routing line can be insulated from each other on the encapsulation layer ENCAP, and can be electrically connected to each other on an area except an area where the encapsulation layer ENCAP is disposed.

The encapsulation layer ENCAP can include an inclined portion positioned on the non-active area NA. The first touch routing line and the second touch routing line can be insulated from each other on the inclined portion The first touch routing line and the second touch routing line can be electrically connected to each other on an area adjacent to a boundary of the active area AA.

The portion of the first touch routing line disposed on the non-active area can be integral with the second touch routing line.

The portion of the first touch routing line disposed on the active area AA can be disposed to be separated from the touch electrode line part connected to the second touch routing line on the active area AA.

The portion of the first touch routing line disposed on the active area AA can be positioned inside of the touch electrode line part connected to the second touch routing line.

A portion of the first touch routing line disposed on the active area AA can be disposed on a same layer as a layer where the touch electrode line part connected to the second touch routing line is disposed.

The touch display device can include at least one touch electrode connecting auxiliary line crossing the first touch routing line on the active area, and connected to the touch electrode line part connected to the second touch routing line.

The touch electrode line part connected to the second touch routing line can include at least two part separated from each other by an area where the first touch routing line is disposed on the active area and electrically connected to each other by the touch electrode connecting auxiliary line.

The first touch routing line and the second touch routing line can be electrically connected to each other on at least one point positioned between a boundary of the active area AA and the touch driving circuit TDC.

The first touch routing line and the second touch routing line can be supplied a same signal from the touch driving circuit TDC in a same period.

A point where the first touch routing line and the second touch routing line are electrically connected to each other can be positioned more adjacent to the touch driving circuit TDC than the boundary of the active area AA.

According to embodiments of the present disclosure described above, as the touch electrode line TEL is disposed to be divided as two or more touch electrode line parts on the active area AA and the two or more touch electrode line parts are connected to different touch routing lines TL, thus an entire load by the touch electrode line TEL and the touch routing line TL can be reduced.

As a portion of at least one of the touch routing line TL connected to the two or more touch electrode line parts is disposed on the active area AA, thus the non-active area NA may not increase due to an arrangement of the touch routing line TL.

As the touch routing lines TL connected to different touch electrode line parts are electrically connected to each other between the active area AA and the touch driving circuit TDC, thus an entire load can be reduced and a performance of the touch sensing can be improved without an increase of a channel of the touch driving circuit TDC due to an addition of the touch routing line TL.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device, comprising:
a substrate including an active area and a non-active area positioned outside of the active area, the active area including a plurality of subpixels;
an encapsulation layer on at least a part of the active area and the ion-active area;
a plurality of touch electrode lines on the active area on the encapsulation layer, the plurality of touch electrode lines including two or more touch electrodes electrically connected to each other along one direction; and a plurality of touch routing lines electrically connected to at least one of the plurality of touch electrode lines, wherein some of the plurality of touch electrode lines are connected to a first touch routing line partially disposed on the active area, wherein at least one of the plurality of touch electrode lines comprises touch electrode line parts separated into a first part and a second part, and wherein the first part and the second part of the at least one of the plurality of touch electrode lines are electrically connected by a touch electrode connecting line in the active area.

2. The touch display device of claim 1, further comprising:

a second touch routing line on the non-active area, the second touch routing line connected to some of the plurality of touch electrode lines.

3. The touch display device of claim 2, wherein the first touch routing line and the second touch routing line are electrically connected to each other on a printed circuit board comprising a touch driving circuit configured to drive the plurality of touch routing lines.

4. The touch display device of claim 2, wherein the first touch routing line and the second touch routine line are electrically connected to each other by at least one pad of a plurality of pads on the non-active area.

5. The touch display device of claim 4, wherein the plurality of pads include a pad that is electrically connected to the first touch routing line and the second touch routing line, an area of the pad is greater than an area of at least one other pad of the plurality of pads.

6. The touch display device of claim 2, wherein the first touch routing line and the second touch routing line cross each other on at least one point of the non-active area, and the first touch routing line is not connected to the second touch routing line on the at least one point where the first touch routing line crosses the second touch routing line.

7. The touch display device of claim 2, further comprising:

at least one dam on the non-active area, the at least one dam surrounding the active area, and wherein the first touch routine line and the second touch routing line are electrically connected to each other at an area that is non-overlapping with the at least one dam.

8. The touch display device of claim 2, wherein the first touch routing line and the second touch routing line are insulated from each other on the encapsulation layer, and the first touch routing line and the second touch routing line are electrically connected to each other on an area that lacks the encapsulation layer.

9. The touch display device of claim 2, wherein the encapsulation layer includes an inclined portion positioned on the non-active area, and the first touch routing line and the second touch routing line are insulated from each other on the inclined portion.

10. The touch display device of claim 2, wherein the first touch routing line and the second touch routing line are electrically connected to each other at an area adjacent to a boundary of the active area.

11. The touch display device of claim 2, wherein a portion of the first touch routing line disposed on the non-active area is integral with the second touch routing line.

12. A touch display device, comprising:

a substrate including an active area and a non-active area positioned outside of the active area, the active area including a plurality of subpixels;

an encapsulation layer on at least a part of the active area and the non-active area;

a plurality of touch electrode lines on the active area on the encapsulation layer, the plurality of touch electrode lines including two or more touch electrodes electrically connected to each other along one direction; and a plurality of touch routing lines electrically connected to at least one the plurality of touch electrode lines, wherein at least one of the plurality of touch electrode lines include two or more touch electrode line parts that are separated from each other on the active area, wherein a first one of the two or more touch electrode line parts is connected to a first touch routing line partially disposed on the active area, and a second one of the two or more touch electrode line parts includes a first pail and a second part that are physically separated from each other, and wherein the first part and the second part are electrically connected to each other by a line disposed on the active area.

13. The touch display device of claim 12, wherein the first part and the second part are electrically connected to each other by a touch electrode connecting auxiliary line that crosses the first touch routing line on the active area.

14. The touch display device of claim 12, wherein at least one of the first part or the second part is electrically connected to a touch electrode connecting line.

15. The touch display device of claim 14, wherein at least a part of the touch electrode connecting line is disposed in a direction in which the first touch routing line is disposed.

16. The touch display device of claim 12, wherein the second one of the two or more touch electrode line parts is electrically connected to a second touch routing line disposed on the non-active area.

17. The touch display device of claim 12, wherein at least a part of the second one of the two or more touch electrode line parts is disposed between the first one of the two or more touch electrode line parts and the non-active area.

18. The touch display device of claim 12, wherein the first part and the second part are physically separated with each other by an area on which the first touch routing line is disposed.

* * * * *